United States Patent [19]

Manabe et al.

[11] Patent Number: 4,770,786

[45] Date of Patent: Sep. 13, 1988

[54] SEPARATION OF ORGANIC LIQUID FROM MIXTURE EMPLOYING POROUS POLYMERIC ULTRAFILTRATION MEMBRANE

[75] Inventors: Seiichi Manabe; Hideki Iijima, both of Ibaraki, Japan

[73] Assignee: Asahi Kasei Kogyo Kabushiki Kaisha, Osaka, Japan

[21] Appl. No.: 712,491

[22] Filed: Mar. 15, 1985

Related U.S. Application Data

[63] Continuation of Ser. No. 443,077, Nov. 19, 1982, abandoned.

[30] Foreign Application Priority Data

| Nov. 30, 1981 | [JP] | Japan | 56-190696 |
| Apr. 19, 1982 | [JP] | Japan | 57-64026 |
| Apr. 20, 1982 | [JP] | Japan | 57-64661 |
| Apr. 21, 1982 | [JP] | Japan | 57-65406 |
| Apr. 22, 1982 | [JP] | Japan | 57-66397 |
| Apr. 28, 1982 | [JP] | Japan | 57-70315 |
| May 6, 1982 | [JP] | Japan | 57-74487 |

[51] Int. Cl.$^4$ ............................................. B01D 13/00
[52] U.S. Cl. ..................................... 210/640; 210/651; 210/655; 210/500.29
[58] Field of Search ............... 210/637, 638, 639, 640, 210/641, 644, 650–655, 500.29; 55/16, 158; 203/10, 11, 99, DIG. 17; 202/174, 236, 173, 266; 159/DIG. 27, 17 R

[56] References Cited

U.S. PATENT DOCUMENTS

| 2,981,680 | 4/1961 | Binning | 210/641 X |
| 3,206,397 | 9/1965 | Harvey | 210/652 |
| 3,532,621 | 10/1970 | Hough | 210/638 |
| 3,883,626 | 5/1975 | Kamide et al. | 210/500.2 X |
| 3,956,112 | 5/1976 | Lee et al. | 210/644 |
| 4,581,140 | 4/1986 | Manabe et al. | 210/500.29 |
| 4,604,326 | 8/1986 | Manabe et al. | 210/500.23 X |

FOREIGN PATENT DOCUMENTS

| 105866 | 8/1980 | Japan. |
| 55-131028 | 10/1980 | Japan. |
| 56-7724 | 2/1981 | Japan. |

OTHER PUBLICATIONS

Fane, A. G. et al., "The Relationship Between Membrane . . . ," J. of Membrane Science, 9(1981), pp. 245–262, Oct. 1981.

Blatt, W. F., "Membrane Partition chromatography . . . ," J. Agr. Food Chem., vol. 19, No. 4, 1971, pp. 589–594.

Kamide, K. et al., "Mechanism of Permselectivity . . . ", The Society of Polymer Science, Japan, vol. 13, No. 5, pp. 459–479, (1981).

Preuber, Von H. J., "Die Ultrastruktur . . . " Kolloid-Z, U. Z. Polymer 250, pp. 579–583, 1972.

Asanuma, Y. et al., "Membrane Plasmapheresis . . . ", Proc. Eur. Soc. Artif. Intern. Organs, 6, 1979, pp. 308–312.

*Primary Examiner*—Frank Sever
*Attorney, Agent, or Firm*—Sprung, Horn, Kramer & Woods

[57] ABSTRACT

A process for separating and condensing at least one selected organic liquid from a feed comprising a mixture thereof in the state of one phase or two phases which comprises conducting ultrafiltration by using a polymeric porous membrane having a mean pore size ($2\bar{r}a$) of at least $10^{-6}$ cm and a porosity (Pr) of at least 50% under the conditions that the effective pressure gradient ($\Delta P/d$) loaded on the polymeric porous membrane satisfies the following equations:

$$\Delta P/d < 1000 \qquad \text{(cmHg/cm) (1)}$$

and $$\Delta P/d \leq 1 \times 10^{-1} d\eta/[(\bar{r}a)^2 \cdot Pr] \qquad \text{(cmHg/cm) (2)}$$

wherein
ΔP (cmHg) is the effective pressure difference between one and the other surfaces of the membrane,
d(cm) is a thickness of the membrane,
ra(cm) is a mean pore radius of the membrane,
Pr(%) is a porosity of the membrane and
η(centipoise) is a viscosity of the selected organic liquid.

33 Claims, 4 Drawing Sheets

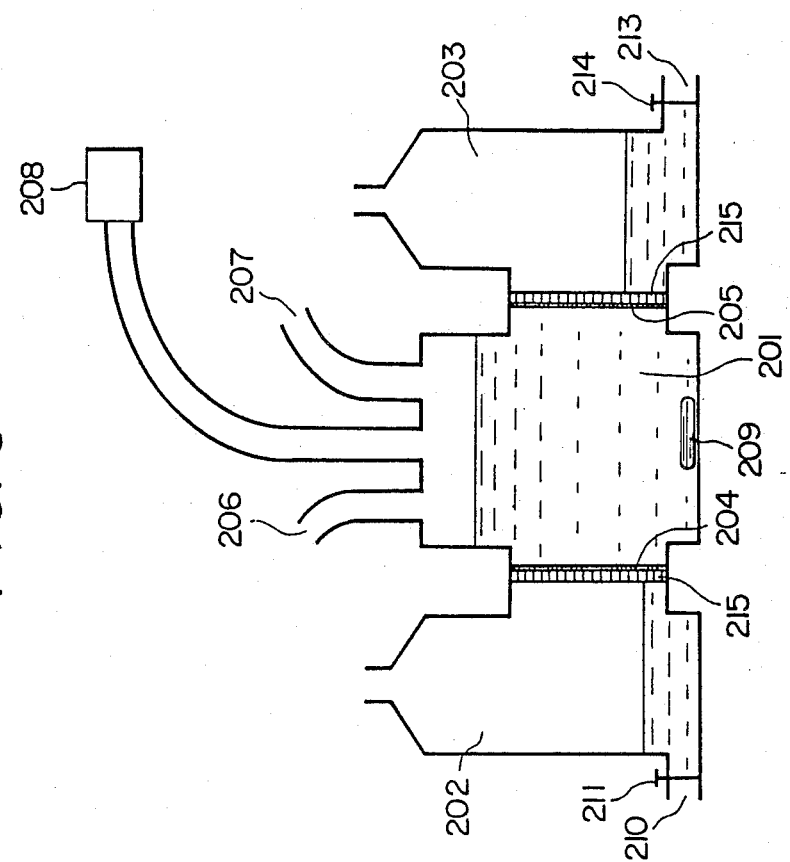
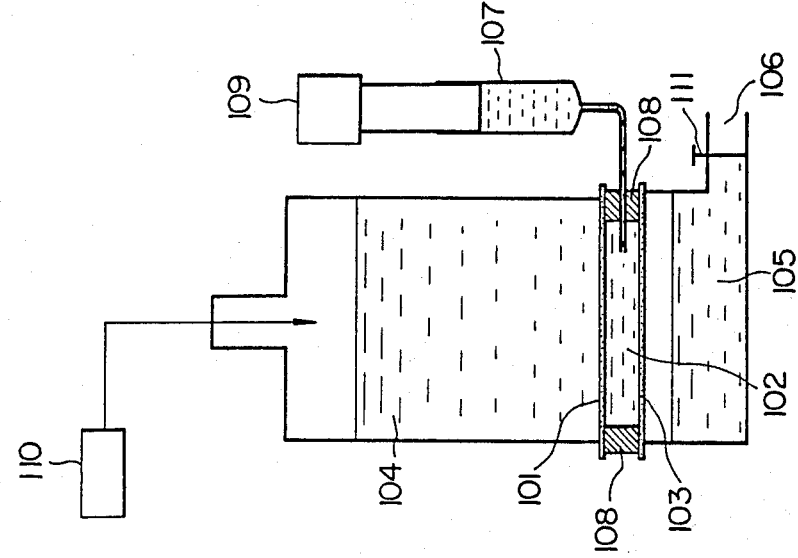

SEPARATION OF ORGANIC LIQUID FROM MIXTURE EMPLOYING POROUS POLYMERIC ULTRAFILTRATION MEMBRANE

This is a continuation, of application Ser. No. 443,077, filed Nov. 19, 1982 now abandoned.

DESCRIPTION

TECHICAL FIELD

The present invention relates to the membrane filtration with a great permeation rate (J) per unit area of a polymeric porous membrane and an excellent separation coefficient ($\alpha$) under a low pressure difference ($\Delta P$) loaded on the polymeric porous membrane, i.e., using a polymeric porous membrane having a mean pore size[$2\text{-}ra(ra\text{:mean pore radius})$] of at least $10^{-6}$ cm and a porosity(Pr) of at least 50%.

BACKGROUND ART

As the membrane filtration technique for separating and condensing a solvent, a solute or an insoluble substance in a solution there are known ones by reverse osmosis, pervaporation or ultrafiltration. Desalting of sea water with a reverse osmosis membrane having a mean pore size of, in general, at most 50 Å(0.005 $\mu$m) is already partly practiced. However, since this filtration with a reverse osmosis membrane is usually carried out under a high pressure of 20 to 50 atmospheres and the permeability coefficient(Pe) is very small, i.e., $10^{-14}$ (cm$^2$/sec.cmHg), the filtration efficiency is very poor and the apparatus employed must be disadvantageously enlarged. The mean pore size of a porous membrane employed in the pervaporation is generally as large as that in the reverse osmosis or not more than 100 Å. According to this method one side of the porous membrane is kept in a vacuum and a solvent in a vaporous state is allowed to permeate through the porous membrane and is cooled and condensed. A number of studies have been made on the pervaporation as the method of separating and condensing a solvent in a solution. In this method the pressure difference($\Delta P$) is one atmosphere and the separation coefficient($\alpha$) is at most about 25 under the present situation. Since the permeability coefficient(Pe) is verl low, i.e., $10^{-10}$(cm$^2$/sec.cmHg) and a large amount of energy is necessary for maintaining the vacuum state and cooling the permeated solvent, it may be said that this technique is still far from practice.

An organic liquid in a mixture thereof in the state of one phase cannot be separated and condensed by the conventional operation conditions under pressure in the ultrafiltration using a porous membrane having a $2\overline{ra}$ of at least $10^{-6}$ cm, which, accordingly, has not been taken into consideration for the separation and condensation of an organic liquid. Further, it has been considered that the separation and condensation of an organic liquid in a mixture thereof in the state of one phase using a porous membrane having a $2\overline{ra}$ of not less than $10^{-6}$ cm is theoretically impossible.

As stated above, under the present situation there cannot be found a membrane filtration technique having a large Pe and a large $\alpha$ at the same time for the separation and condensation of an organic liquid in a mixture thereof in the state of one phase among the generally known membrane filtration techniques.

It is generally said that in order to increase the permeation rate(J) per unit area of a porous membrane, either the porosity(Pr) and the mean pore radius($\overline{ra}$) of the porous membrane and the pressure difference($\Delta P$) are preferably increased or the thickness(d) is preferably thinned. However, in the conventional operation conditions under pressure or reduced pressure there are a negative correlation between the J and the $\alpha$ at $\alpha \geqq 1$ and a positive correlation between them at $\alpha \leqq 1$, and when the J is increased, the $\alpha$ approaches 1 without exception. Thus it has been considered impossible to carry out separation at a high efficiency with increased J and $\alpha$ at the same time in ultrafiltration.

On the other hand, as the method of separating and condensing a selected organic liquid in a mixture thereof in the state of one phase by utilizing the difference in solubility among the liquid components in the mixture there is known a method of separation by liquid-liquid extraction. More specifically, a specified organic liquid for extraction is mixed with the mixture in the state of one phase, and the resultant mixture is stirred to form a state of dispersion of fine particles consisting mainly of the mixture in the state of one phase or the liquid for extraction in which the selected organic liquid is dissolved. Then the dispersion thus formed is left to stand to separate the dispersion into two phases, and the upper and lower layers formed are collected, respectively. According to this method the standing of the dispersion is essential and has difficulty in continuously conducting the separation and recovery steps. Furthermore, when the standing of the dispersion requires a long period of time, a large apparatus for extraction and standing is necessary, and a large amount of the liquid for extraction remains in this procedures. If the liquid for extraction is expensive, the cost for the separation of the liquid disadvantageously becomes high. Especially when the difference in density between a disperse phase and a dispersion medium is small, it is impossible to separate the dispersion into two phases by standing and as a result, the method of separation by liquid-liquid extraction cannot be employed. Thus, with respect to the separation and condensation of ethanol from its aqueous solution there is no membrane filtration technique which can be practiced on an industrial scale.

DISCLOSURE OF THE INVENTION

An object of this invention is to provide a process for separating and condensing a selected organic liquid from a feed comprising a mixture thereof in the state of one phase with a sufficiently high Pe and at the same time an $\alpha$ of $\alpha > 10$ or $1/\alpha > 10$.

Another object of this invention is to provide a process for separating condensing ethanol from a mixture thereof with a sufficiently high Pe and at the same time an ethanol separation coefficient($\alpha$) of at least about 20.

Additional objects and advantages of the invention will be set forth in the description that follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the present invention in one embodiment (hereinafter referred to "first embodiment") provides a process for separating and condensing at least one selected organic liquid from a feed comprising a mixture thereof in the state of one phase or two phases which comprises conducting ultrafiltration by using a polymeric porous membrane having a mean pore size($2\overline{ra}$) of at least $10^{-6}$ cm and a porosity(Pr) of at least 50% and typically less than about 99% under the conditions that the effective pressure gradient($\Delta P/d$) loaded on the membrane satisfies the following equations:

$$\Delta P/d < 1000 (cmHg/cm) \quad (1)$$

and $$\Delta P/d \leq 1 \times 10^{-1} d\eta/[(\overline{ra})^2 \cdot Pr](cmHg/cm) \quad (2)$$

wherein
$\Delta P$(cmHg) is a pressure difference between one and the other surfaces of the membrane,
d(cm) is a thickness of the membrane,
$\overline{ra}$(cm) is a mean pore radius of the membrane,
Pr(%) is a porosity of the membrane and
$\eta$(centipoise) is a viscosity of the selected organic liquid.

The present invention in another embodiment (hereinafter referred to "second embodiment") provides a process for separating and condensing at least one selected organic liquid from a feed compfising a mixture thereof in the state of one phase which comprises conducting ultrafiltration by contacting, through a polymeric porous membrane having a $2\overline{ra}$ of at least about $10^{-6}$ cm and a Pr of at least 50% and typically less than 99%, the feed with one surface of the polymeric porous membrane, and a liquid(hereinafter referred to "liquid(B)") which is a non-solvent for the polymeric porous membrane but is a good solvent for at least one of the liquids in the feed and is simultaneously a poor solvent or a non-solvent for at least one of the liquids in the feed with the other surface of the polymeric porous membrane under the condition that the effective pressure gradient($\Delta P/d$) loaded on the polymeric porous membrane satisfies the equations(1) and (2) as described above and the pressure difference between the two surfaces of the polymeric porous membrane($\Delta P$) satisfies the following equation:

$$\Delta P \leq 2 \times 10^{-5}/\overline{ra}(cmHg) \quad (3)$$

where $\Delta P$ and $\overline{ra}$ are the same as defined above.

The present invention in still another embodiment (hereinafter referred to "third embodiment") provide a process for separating and condensing at least one selected organic liquid from a feed comprising a mixture thereof in the state of one phase which comprises conducting ultrafiltration by contacting, through a polymeric porous membrane(X) having a $2\overline{ra}$ of at least $10^{-6}$ cm and a Pr of at least 50% and typically less than 99%, the feed with one surface of the polymeric porous membrane(X); a liquid(B) which is a non-solvent for the polymeric porous membrane(X) and another polymeric porous membrane(Y) separately provided having a $2\overline{ra}$ of at least $10^{-6}$ cm and a Pr of at least 50% and is a good solvent for at laast one of the organic liquids in the feed but a non-solvent for at least one of the organic liquids in the feed and is simultaneously capable of causing phase separation in the feed with the other surface of the polymeric porous membrane(X); and the liquid(B) with one surface of the polymeric porous membrane(Y) under the conditions that the pressure differences($\Delta P$) loaded on the polymeric porous membranes(X) and (Y) satisfy the equations(1) to (3) as described above.

The present invention in a further embodiment (hereinafter referred to "fourth embodiment") provides a process for separating and condensing at least one selected organic liquid from a feed comprising a mixture thereof in the state of one phase which comprises rendering the feed in the state of phase separation and conducting the ultrafiltration of the feed in the state of phase separation simultaneously or successively by using a hydrophilic porous membrane and a hydrophobic porous membrane both having a $2\overline{ra}$ of at least $10^{-6}$ cm and a Pr of at least 50% and typically less than 99% under the conditions that the pressure differences($\Delta P_1$ and $\Delta P_2$) loaded on the hydrophilic and hydrophobic porous membranes satisfy the following equations, respctively:

$$\Delta P_1/d < 1000(cmHg/cm) \quad (1)'$$

$$\Delta P_2/d < 1000(cmHg/cm) \quad (1)''$$

and $$\Delta P_1/d \leq 1 \times 10^{-1} d\eta/[(\overline{ra}_1)^2 \cdot Pr](cmHg/cm) \quad (2)'$$

$$\Delta P_2/d \leq 1 \times 10^{-1} d\eta/[(\overline{ra}_2)^2 \cdot Pr](cmHg/cm) \quad (2)''$$

and at the same time under the following conditions of pressure:

$$\Delta P_1 \leq 4 \times 10^{-5}/\overline{ra}_1(cmHg/cm) \quad (4)$$

$$\Delta P_2 \leq 4 \times 10^{-5}/\overline{ra}_2(cmHg/cm) \quad (5)$$

wherein
$\Delta P_1$ and $\Delta P_2$(cmHg) are hydrostatic pressure differences between one and the other surfaces of the hydrophilic porous membrane and the hydrophobic porous membrane, respectively, and
$\overline{ra}_1$ and $\overline{ra}_2$(cm) are mean pore radii of the hydrophilic porous membrane and the hydrophobic porous membrane, respectively.

The present invention in a still further embodiment (hereinafter referred to "fifth embodiment") provides a process for separating and condensing ethanol from an aqueous ethanol solution which comprises rendering to the aqueous ethanol solution in the state of phase separation by addition of at least one substance selected from the group consisting of (a) fluorides, hydroxides, sulfates, carbonates or thiosulfates of an alkali metal, (b) sulfates of a metal cation having an ionic radius of at least 1.30 Å except an alkali earth metal and having a solubility in water at 25° C. of at least about 10 g/100 ml and (c) ammonium salts to the aqueous ethanol solution and conducting the ultrafiltration of the aqueous ethanol solution in the state of phase separation by using a hydrophilic porous membrane and a hydrophobic polymeric porous membrane both having a $2\overline{ra}$ of at least about $10^{-6}$ cm and a Pr of at least 50% and typically less than 99%, whereby separating and condensing ethanol.

The present invention in a still more further embodiment(hereinafter referred to "sixth embodiment")

provides a process for separating and condensing ethanol from an aqueous ethanol solution which comprises rendering the aqueous ethanol solution in the state of phase separation by mixing an entrainer with the aqueous ethanol solution and conducting the ultrafiltration of the aqueous ethanol solution in the state of phase separation by using at least one pair of a hydrophilic polymeric porous membrane and a hydrophobic polymeric porous membrane both having a $2\overline{ra}$ of at least $10^{-6}$ cm and a Pr of at least 50% and typically less than 99%, whereby separating the aqueous ethanol solution into two homogeneous phase of a solution having a higher water content and a solution having a lower water content.

In the present invention the polymeric porous membrane means the one having pores which can be confirmed by an electron microscope and straight-through pores, and does not include porous membranes employed for reverse osmosis or dialysis type artificial kindney. Also the polymeric porous membrane of this invention has a maximum pore size which can be clearly determined by the bubble point method, and accordingly means a membrane similar to a so-called screen type membrane filter having a function of catching particles to be separated in a plane.

The feed of this invention means the one constituted of at least two compounds having a molecular weight of at most about 1000 and an organic liquid in the state of one phase thermodynamically where the compounds are mixed with one another in molecularly dispersed state.

According to the first embodiment of the process of this invention, a selected organic liquid in a feed comprising a mixture thereof in the state of one phase can be separated and condensed with a sufficiently great permeability coefficient(Pe) at a separation coefficient($\alpha$) of $\alpha > 10$ or $1/\alpha > 10$.

When ultrafiltration is conducted using a polymeric porous membrane having a mean pore size($2\overline{ra}$) of at least $10^{-6}$ cm and a porosity(Pr) of at least 50% and typically less than 99% under the conditions that the effective pressure gradient[$\Delta P/d$(cmHg/cm)] loaded on the polymeric porous membrane is less than 1000, (cmHg/cm) preferably less than 200 (cmHg/cm) and the relationship among the thickness [d(cm)] of the polymeric porous membrane, the mean pore radius[$\overline{ra}$(cm)] of the polymeric porous membrane, the porosity [Pr(%)] of the polymeric porous membrane and the viscosity [$\eta$(centipoise)] of a selected organic liquid to be separated and condensed satisfies the equation $\Delta P/d \leq 1 \times 10^{-1} d\eta/[(\overline{ra})^2 \cdot Pr]$(cmHg/cm), the selected organic liquid can be separated and condensed from a feed comprising a mixture thereof in the state of one phase.

In the ultrafiltration under the conditions outside the above described ranges, the separation efficiency($\alpha$) is nearly equal to one. With mean pore sizes($2\overline{ra}$) of less than $10^{-6}$ cm, the permeation rate(J) is remarkably reduced and also with porosities of less than 50%, both the separation efficiency($\alpha$) and the permeation rate(J) decrease.

In the ultrafiltration the affinity between the polymeric substance constituting the porous membrane and the selected liquid to be separated is an important factor. When this mutual interaction is represented by the respective solubility parameters, it is preferred that the difference between the solubility of the polymeric substance constituting the polymeric porous membrane($\delta_p$) and that of the selected organic liquid to be separated($\delta_s$) is at most 15 (cal cm$^3$)$^{\frac{1}{2}}$. More strictly speaking, it is more preferred that the solubility parameter of the polymeric substance constituting the polymeric porous membrane is at most about 8.5(cal/cm$^3$)$^{\frac{1}{2}}$ or at least 10(cal/cm$^3$)$^{\frac{1}{2}}$. The respective solubility parameter us defined by "ENCYCLOPEDIA OF POLYMER SCIENCE AND TECHNOLOGY VOL. 3 P.834 (Ed. by H. F. MARK, N. G. GAYLORD and N. M. BIKALES, John Wiley & Sons, Inc., New York)".

The separation and concentration of a selected organic liquid from a feed comprising a mixture thereof can be attained by the interaction between the polymeric substance constituting the porous membrane and the selected organic liquid, and it is more effective that the polymeric porous membrane is swollen with a liquid as the swelling agent having a solubility parameter of from $\delta_p - 3$(cal/cm$^3$)$^{\frac{1}{2}}$ to $\delta_p + 3$(cal cm$^3$)$^{\frac{1}{2}}$ and simultaneously smaller than $\delta_s - 3$(cal cm$^3$)$^{\frac{1}{2}}$ or greater than $\delta_s + 3$(cal/cm$^3$)$^{\frac{1}{2}}$. With regard to the combination of organic liquids to be separated in a feed which is subjected to ultrafiltration, it is preferred that the difference between the solubility parameters of at least two liquids to be separated in the feed is at least 2 (cal cm$^3$)$^{\frac{1}{2}}$.

The swelling treatment according to the process of this invention is effective for all the polymeric material substances constituting the polymeric porous membranes of this invention including, for example, cellulose acetate, ethyl cellulose, polymethyl methacrylate, polyethyl methacrylate, poly-n-butyl methacrylate, poly-t-butyl methacrylate, cellulose nitrate, regenerated cellulose, aromatic polyhydrazide, poly-p-phenylene tetraphthalamide, polyvinyl chloride, polyacrylonitrile, polyvinyl alcohol, polymethacrylic acid, polymethylsiloxane, polyvinylidene fluoride, polyester, polyimide, polyoxadiazole, polysulfone, polycarbonate, polyurethane, polypropylene glycol, polyhydroxy ether, polyethylene, polypropylene, nylon 6, nylon 66, polytetrafluoroethylene, polychlorotrifluoroethylene, polybutadiene, polyisoprene and acrylonitrile/vinylidene chloride copolymer. Of these polymeric material substances, the swelling treatment of regenerated cellulose with water is remarkably effective.

As stated above, according to the present process of this invention it is possible to rapidly separate a selected organic liquid at a high concentration from a feed comprising a mixture thereof in the state of one phase while maintaining the separation coefficient($\alpha$) high and at the same time the permeability coefficient(Pe) high in the separation and condensation of a liquid.

The characteristic feature in the effects of the present process of this invention resides in the separation at high efficiency if the specified conditions among the thickness of a porous membrane(d), the pressure difference ($\Delta P$), the porosity(Pr) and the mean pore radius($\overline{ra}$) as defined by the equations(1) to (3) are satisfied, notwithstanding that the mean pore size of the polymeric porous membrane($2\overline{ra}$) is large, i.e., at least $10^{-6}$ cm. Furthermore, the separation efficiency can be increased by subjecting the polymeric porous membrane to swelling treatment with a swelling agent for the polymeric material substances constituting the polymeric porous membrane.

According to the second embodiment of the process of this invention, also a selected organic liquid in a feed comprising a mixture thereof in the state of one phase can be separated and condensed with a sufficiently great Pe at an $\alpha$ of $\alpha > 10$ or $1/\alpha > 10$.

As a first characteristic feature of the present process, the porous membrane employed has a $\overline{2r_a}$ of at least $10^{-6}$ cm. This $\overline{2r_a}$ is twice as large as the one of the conventional membrane for reverse osmosis and the J per unit area of the porous membrane of this invention is at least 10 times as large as the one of the conventional porous membrane. With increased $\overline{2r_a}$, the J is increased but for practical purposes the pressure difference($\Delta P/d$) loaded on the menbrane is preferably made small. Thus a maximum $\overline{2r_a}$ depends upon the chemical structure of the liquid to be separated, and the polymeric material substance constituting the polymeric porous membrane and is typically at most $2 \times 10^{-3}$ cm, preferably at most about $2 \times 10^{-3}$ cm. With $\overline{2r_a}60$ of less than $10^{-6}$ cm, the J is remarkably reduced and surprisingly the $\alpha$ is inversely reduced and approaches one.

As a second characteristic feature, the ultrafiltration is conducted under the specified conditions where the effective pressure gradient($\Delta P/d$) loaded on the membrane satisfies the ranges defined by the equations(1) and (2). Outside these ranges the $\alpha$ is nearly equal to zero and practically the separation of an organic liquid becomes impossible.

According to this process, when ultrafiltration is carried out by contacting, through a polymeric porous membrane, a feed in the state of one phase with one side of the polymeric porous membrane, and a liquid(B) with the other side of the polymeric porous membrane, a selected organic liquid in the feed can be continuously separated and condensed. By continuing the addition of the liquid(B) to the feed in the state of one phase, the feed is separated into two phases. The liquid permeating through the membrane is greatly affected by the chemical structure of the polymeric material substance constituting the polymeric porous membrane employed. For example, in the case of a hydrophilic polymeric porous membrane such as a regenerated cellulose porous membrane a hydrophilic liquid in the feed permeates through the membrane into the liquid(B). On the other hand, in the case of a hydrophobic membrane such as a polytetrafluoroethylene porous membrane, a polyethylene porous membrane and a polypropylene porous membrane, a hydrophobic liquid permeates through the porous membrane into the liquid(B). When ultrafiltration is conducted using a liquid(B) which is a good solvent cr a swelling solvent for the porous membrane in a filtering apparatus as illustrated in FIG. 1, the liquid(B) reversely flows into the feed in the state of one phase to be separated, resulting a difficulty in separating and condensing the selected organic liquid. However, in case the density of the liquid(B) is greater than that of the feed, it is sometimes preferred that the liquid(B) is a swelling agent for the porous membrane and, for example, the ultrafiltration by a filtering apparatus as illustrated in FIG. 2 is such a case.

Also, when the liquid(B) is a good solvent for all the liquids constituting the feed, the separation and condensation by ultrafiltration is impossible except a special case. An example of such a special case is the separation of a mixture of acetone and phenol as the feed with water as the liquid(B) at a temperature of at least 60° C.

It is preferred that the chemical structure of a liquid(B) is different from that of the polymeric material substance constituting a polymeric porous membrane to a greater extent and that the liquid(B) has no compatibility with a selected liquid permeating through the membrane into the liquid(B). When the liquid(B) has compatibility with the selected liquid permeating through the membrane into the liquid(B), it is preferred in the separation of the liquid from the liquid(B) that the liquid(B) has a lower boiling point and a smaller evaporation heat than the selected liquid.

In the filtering apparatus as illustrated in FIG. 1 which can be employed in this invention a chamber for a feed 1 is parallel to a chamber for a liquid(B) 2 across a polymeric porous membrane 3 and the chamber 1 is pressurized by a pressure source 4 such as a compressor. The side of the polymeric porous membrane 3 facing the chamber 1 is A surface and that facing the chamber 2 is B surface. The feed is charged from an inlet 5 to the chamber 1 and collected from an outlet 6 by a cock 9 while the liquid(B) is charged from an inlet 7 to the chamber 2 and collected from an outlet 8 by a cock 10 together with a filtrate.

In the apparatus as illustrated in FIG. 2, which can be employed in this invention a chamber for a feed 11 is positioned above a chamber for a liquid(B) 12 across a polymeric porous membraJbNe 13 which is supported with a mesh supporter 14. The chamber 11 is pressurized by a pressure 20 source 15 such as a compressor. The side of the polymeric porous membrane 13 facing the chamber 11 is A surface and that facing the chamber 12 is B surface. The feed is charged from an inlet 16 to the chamber 11 while the liquid(B) is charged from an inlet 17 to the chamber 12 and collected from an outlet 18 by a cock 20 together with a filtrate.

The hydrophilic polymeric porous membrane according to this invention means the one constituted of a polymeric material substance having a solubility parameter of at least $12.5(cal/cm^3)^{\frac{1}{2}}$ and the hydrophobic polymeric porous membrane means the one constituted of a polymeric material substance having a solubility parameter of at most $10.0 \ (cal/cm^3)^{\frac{1}{2}}$.

In the present process, when the solubility parameter of the polymeric material substances constituting the polymeric porous membranes($\delta_p$) is at most $10(cal/cm^3)^{\frac{1}{2}}$ or at least $12.5(cal/cm^3)^{\frac{1}{2}}$, the range of selecting the liquid(B) is preferably widened. It is more preferred to employ hydrophobic polymeric material substances having a solubility parameter of at most $9(cal/cm^3)^{\frac{1}{2}}$ or hydrophilic polymeric material substances having a solubility parameter of at least $15(cal/cm^3)^{\frac{1}{2}}$.

Suitable examples of these polymeric material substance include polytetrafluoroethylene[solubility parameter($\delta_p$): $6.2(cal/cm^3)^{\frac{1}{2}}$, hereinafter abbreviated as "6.2"], polychlorotrifluoroethylene(7.2), polybutadiene(8.40), polypropylene(8.02), polyethylene(8.56), polypropylene glycol (8.66), polymethylsiloxane(7.5), polyisoprene(8.10), polyethyl methacrylate(9.0), poly-n-butyl methacrylate(8.7), poly-t-butyl methacrylate(8.3), cellulose acetate(12.65;13.14; 12.98), poly-p-phenylene terephthalamide(15.89), aromatic polyhydrazide(16.25), polyvinyl alcohol(19.06) and regenerated cellulose(24.08). In case a combined membrane is used, its solubility parameter($\delta_p$) means the one of the chemical substance constituting the surface of a polymeric porous membrane. Even if a mean solubility parameter calculated from a mean composition of the polymeric material substances constituting the polymeric porous membrane does not fall within the above described range, and when the surface of the polymeric porous membrane is chemically modified and the solubility parameter of the polymeric material substance constituting the modified surface of the polymeric porous membrane falls within the above described range, the polymeric porous membrane having such a solubility parameter can also be employed in the separation and condensation of organic liquids by ultrafiltration according the present process of this invention.

When the porous membrane is constituted of the polymeric material substance having a solubility parameter of at least $15(cal/cm^3)^{\frac{1}{2}}$ and a hydrophobic liquid is employed as the liquid(B), the range of selecting an organic liquid to be separated and condensed can be widened.

The effective range of the $\Delta P/d$ and the $\Delta P$ in the equations(1) to (3) depends upon the pore shape of a polymeric porous membrane. With two polymeric porous membranes having nearly equal $\overline{ra}$ and Pr, the effective range of the $\Delta P6/d$ and the $\Delta P$ increases when the pore shape becomes a nearer round. The equations(1) to (3) represent the range for a round pore shape and when the pore shape becomes a non-round, the effective range of the $\Delta P/d$ and the $\Delta P$ is more narrow than that of the equations(1) to (3).

Furthermore, when vibration is generated in the liquid(B) or the feed in the vicinity of the surfaces of the porous membrane by generating an ultrasonic wave at a right angle to the porous membrane, both the Pe and the $\alpha$ can be increased by about 10 to 30%. This may be considered to be due to the stirring effect on the porous membrane in the feed and the liquid(B).

According to the third embodiment of the present process of this invention, a selected organic liquid in a feed comprising a mixture thereof in the state of one phase can be separated with a sufficiently great Pe and simultaneously an $\alpha$ of $\alpha>10$ or $1/\alpha>10$.

In the present process, one side of a polymeric porous membrane(X) contacts a feed in the state of one phase to be separated and the other side of the polymeric porous membrane(X) contacts a liquid(B) which is a non-solvent for the membrane(X) but is a good solvent for at least one of the organic liquids in the feed and is simultaneously a poor solvent or a non-solvent for at least one of the organic liquids in the feed. When the liquid(B) is continuously added to the feed, the liquid(B) serves to cause phase separation to separate the feed into two phases. The organic liquid permeating through the membrane(X) is strongly affected by the chemical structure of the polymeric material substance constituting the membrane(X). When a hydrophilic polymeric porous membrane such as a regenerated cellulose porous membrane is employed, a hydrophilic organic liquid permeates through the membrane(B) and mixes into the liquid (B). On the other hand, when a hydrophobic polymeric porous membrane such as polytetrafluoroethylene, polyethylene and polypropylene porous membranes is employed, a hydrophobic organic liquid filtrates through the membrane(X). If the liquid(B) is a good solvent or a swelling solvent for the membrane(X), the liquid(B) flows backward into the feed to be separated and as a result, it is difficult to separate and concentrate a selected organic liquid. However, there is a case where the liquid(B) is preferably a swelling agent or the membrane(X) if the density of the liquid(B) is greater than that of the feed to be separated. Such a case is the ultrafiltration using a filtering apparatus as illustrated in FIG. 4. When the liquid(B) is a good solvent to all the polymeric material substances constituting the membrane(X), the separation and concentration by ultrafiltration is impossible except a special case. As an example of such a special case, a mixture of acetone and phenol is separated using water as the liquid(B) at a temperature of at least 60° C.

On the other hand, when the liquid(B) is a nonsolvent to all the organic liquids in the feed, the separation and concentration by ultrafiltration is impossible.

In the case of a filtering apparatus as illustrated in FIG. 3, it is preferred that the liquid(B) has a chemical structure different from that of the polymeric material substance to a great extent. In the filtering apparatus as illustrated in FIG. 4 the similarity in chemical structure between the liquid(B) and the polymeric material substance constituting the membrane(X) does not give any problem.

Furthermore, as a characteristic feature of the present process the liquid(B) contacts a polymeric porous membrane(Y) having a $\overline{2ra}$ of at least $10^{-6}$ cm.

A maximum $\overline{2ra}$ of the porous membrane(Y) depends upon the chemical structure of the liquid(B) and the material substance constituting the porous membrane and is typically at most $10^{-3}$ cm, preferably at most $10^{-4}$ cm. With $\overline{2ra}$ of less than $10^{-6}$ cm, the J becomes remarkably small and the $\alpha$ is also reduced.

The porous membrane(Y) can remarkably decrease 20 the amount of the liquid(B) in the filtrate finally obtained, resulting in an increase in the concentration of the selected organic liquid to be separated and condensed in the filtrate. The material substance constituting the membrane(Y) is not necessarily the same as that constituting the porous membrane (X). However, it is necessary that the liquid(B) is a nonsolvent for the porous membrane(Y) and is not a swelling agent for the porous membrane(Y). It is preferred that the space between the porous membrane(X) and (Y) is more narrow, typically at most about 1 mm. Also in order to maintain a high $\alpha$ it is necessary to supply the liquid(B) little by little from outside the filtration system. The liquid(B) may be the one contained in a filter paper by impregnation or in the openings among fine particle substances by infiltration.

When the solubility parameter of the polymeric porous substances constituting the porous membranes(X) and (Y) is at most $10(cal/cm^3)^{\frac{1}{2}}$ or at least $12.5(cal/cm^3)^{\frac{1}{2}}$, the range of selecting the liquid(B) is preferably widened. It is more preferred to employ hydrophobic polymeric material substances having a solubility parameter of at most $9(cal/cm^3)^{\frac{1}{2}}$ or hydrophilic polymeric material substances having a solubility parameter of at least $15(cal/cm^3)$.

Suitable examples of these polymeric substances include polytetrafluoroethylene[solubility parameter($\delta_p$): $6.2(cal/cm^3)$, hereinafter abbreviated as "6.2"], polychloroethylene trifluoride(7.2), polybutadiene(8.40), polypropylene (8.02), polyethylene(8.56), polypropylene glycol(8.66), polymethylsiloxane(7.5), polyisoprene(8.10), polyethyl methacrylate (9.0), poly-n-butyl methacrylate(8.7), poly-t-butyl methacrylate(8.3), cellulose acetate(12.65;13.14;12.98), poly-p-phenylene terephthalamide(15.89), aromatic polyhydrazide (16.25), polyvinyl alcohol(19.06) and regenerated cellulose (24.08). In case a combined membrane is used, its solubility parameter($\delta_p$) means the one of the chemical substance constituting the surface of a porous membrane. Even if a mean solubility parameter calculated from the mean composition of the polymeric substances constituting the porous membrane does not fall within the above described range, and when the surface of the porous membrane is chemically modified and the solubility parameter of the substance constituting the modified surface of the porous membrane falls within the above described range, the porous membrane having such a solubility parameter can also be employed in the separation and condensation of organic liquids by ultrafiltration according the present process of this invention.

When the porous membrane is constituted of the polymeric material substance having a solubility parameter of at least $15(cal/cm^3)^{\frac{1}{2}}$ and a hydrophobic liquid is employed as the liquid(B), the range of selecting an organic liquid to be separated and condensed can be widened.

Ultrafiltration is carried out under the conditions that the pressure difference($\Delta P$) loaded on the porous membranes(X) and (Y) satisfy the above described equations (1) to (3).

The $\Delta P$(cmHg) means a pressure difference between the pressure of the feed and that of the liquid(B) with the porous(X) and a difference between the pressure of the liquid(B) and that of the side of a filtrate recovered. Accordingly, the flow of an organic liquid in the feed to be separated and condensed or an organic liquid in the feed to be separated and removed is a flow of the porous membrane (X)→the liquid(B)→the porous membrane(Y). Outside the above described ranges, the $\alpha$ approaches one and as a result, the separation and condensation of a selected organic liquid becomes impossible.

The effective range of the $\Delta P$ in the equations(1) to (3) depends upon the pore shape of a polymeric porous membrane. With two polymeric porous membranes having nearly equal $2\bar{r}a$ and Pr, the effective range of the $\Delta P$ increases when the pore shape becomes a nearer round. The equations (1) to (3) represent the range for a round pore shape and when the pore shape becomes a non-round, the effective range of the $\Delta P$ is more narrow than that of the equations(1) to (3).

Furthermore, when vibration is generated in the liquid(B) or the feed in the vicinity of the surfaces of the porous membranes by generating an ultrasonic wave at a right angle to the porous membranes, both the Pe and the $\alpha$ can be increased by about 10 to 30%. This may be considered to be due to the stirring effect on the porous menbranes in the feed and the liquid(B).

According the fourth embodiment of the present process of this invention, as a first characteristic feature, a feed in the state of one phase is rendered in the state of phase separation. Since a feed in the state of phase separation can be separated into two layers usually by standing, the separation of such a feed in the state of phase separation using a porous membrane has hardly been tried. Even if such separation is tried, it is the ultrafiltration using one type of a porous membrane and the technique for continuous membrane separation has not been accomplished. Even if the ultrafiltration of a feed in the state of one phase without being rendered in the state of phase separation is conducted using a combination of a hydrophilic polymeric porous membrane and a hydrophobic polymeric porous membrane, the $\alpha$ is almost one and it is substantially difficult to separate and condense a selected organic liquid in the feed on an industrial scale.

As a second characteristic feature, the porous membrane employed in ultrafiltration has a $2\bar{r}a$ of at least $10^{-6}$ cm. Only when the feed to be separated is in the state of phase separation, the porous membrane having such a large pore size can be employed. With $2\bar{r}a$ of less than $10^{-6}$ cm the Pe is extremely reduced, i.e., less than $\frac{1}{2}$ and the $\alpha$ approaches one. Only with $2\bar{r}a$ of at least $10^{-6}$ cm the advantage of rendering the feed in the state of one phase to the one in the state of phase separation appears. A maximum $2\bar{r}a$ of the porous membrane which can be employed in the present process of this invention can be determined mainly depending upon the difference in composition between the feed in the state of one phase to be separated and the two liquids in the state of phase separation, the chemical composition of the porous membrane, the pressure difference($\Delta P$) loaded on the porous membrane and the thickness(d) of the porous membrane. A maximum $2\bar{r}a$ may be assumed to be about 10 times as large as the diameter of dispersion particles present in the feed in the state of phase separation. The maximum $2\bar{r}a$ is typically $2 \times 10^{-3}$ cm. With $2\bar{r}a$ of more than $3 \times 10^{-3}$ cm, an organic liquid cannot be separated and condensed unless the pressure loaded is at most $1 \times 10^{-2}$ cmHg. This loaded pressure corresponds, in general, to a pressure of less than one necessary for maintaining the feed to be separated in a fluidized state, and in principle it is impossible to continuously conduct ultrafiltration using such a porous membrane.

As a third characteristic feature of the present process of this invention, ultrafiltration is simultaneously or successively conducted using a combination of a polymeric hydrophilic porous membrane and a polymeric hydrophobic porous membrane.

It is possible to continuously and completely separate a feed after phase separation into a disperse phase and dispersion medium and recover the two phases by using at least two polymeric porous membranes constituted of polymeric material substances having different solubility parameters. With a hydrophilic polymeric porous membrane alone or a hydrophobic polymeric porous membrane alone it is impossible to continuously separate a feed after phase separation, and the permeation rate(J) decreases with the passage of time and is sometimes reduced to zero(cm³/sec). In order to increase the J, the pressure difference($\Delta P$) loaded on the polymeric porous membrane and the mean pore size($2\bar{r}a$) are preferably increased. However, the separation coefficient ($\alpha$) is extremely reduced if the $\Delta P$ is higher than a specified value defined as a function of the $2\bar{r}a$. Accordingly, it is necessary that in order to simultaneously increase the J and the $\alpha$, the $\Delta P$ and the $2\bar{r}a$ satisfy a specific relationship empirically represented by the following equation:

$$\Delta P \leq C/\bar{r}a (cmHg/cm) \qquad (9)$$

wherein C is a constant determined depending on a polymeric material substance constituting a porous membrane, a range of pore size distribution, a pore shape, a difference in composition between the feed in the state of one phase and a phase after phase separation (e.g., a disperse phase) and a temperature.

When the pore shape is assumed to be round and the range of pore size distribution is assumed to be $\bar{r}_4/\bar{r}_3 \leq 1.5$, the C is about $2 \times 10^{-5}$(cmHg.cm). The $\bar{r}_4$ and $\bar{r}_3$ are defined by the following equations using a frequency pore size distribution function[N(r)].

$$r_3 = \frac{\int r^3 N(r)dr(\text{cm})}{\int r^2 N(r)dr} \tag{10}$$

$$r_4 = \frac{\int r^4 N(r)dr}{\int r^3 N(r)dr(\text{cm})}$$

Accordingly, the equation(9) is represented by the following two equations:

$$\Delta P_1 \leq 4 \times 10^{-5}/\overline{ra}_1 (\text{cmHg}) \tag{4}$$

$$\Delta P_2 \leq 4 \times 10^{-5}/\overline{ra}_2 (\text{cmHg}) \tag{5}$$

wherein the suffixes 1 and 2 in $\Delta P_1$ and $\Delta P_2$ represent a hydrophilic polymeric porous membrane and a hydrophobic polymeric porous membrane, respectively.

In order to increase the $\alpha$, it is prefrrred that the $\Delta P_1$ and the $\Delta P_2$ satisfy the following equations respectively:

$$\Delta P_1 23\ 2 \times 10^{-5}/\overline{ra}_1 (\text{cmHg}) \tag{6}$$

$$\Delta P_2 \leq 2 \times 10^{-5}/\overline{ra}_2 (\text{cmHg}) \tag{7}$$

When the $\Delta P_1$ and the $\Delta P_2$ are reduced within the ranges satisfying the equations(4) and (5), respectively, the $\alpha$ is extremely increased and becomes constant within the ranges satisfying the equations(6) and (7).

When a combination of a hydrophilic porous membrane consisting essentially of a polymeric material substance whose solubility parameter($\delta_p$) is typically at least 12.5)cal/cm$^3$)$^{\frac{1}{2}}$, preferably at least 15(cal/cm$^3$)$^{\frac{1}{2}}$ with a hydrophobic porous membrane consisting essentially of a polymeric material substance whose solubility parameter ($\delta_p$) is typically at most 10(cal/cm$^3$)$^{\frac{1}{2}}$, preferably at most 9(cal/cm$^3$)$^{\frac{1}{2}}$ is employed, the range of composition of the feed in the state of one phase to be separated which can be employed in this invention can be greatly widened.

Suitable examples of these polymeric material substances include polytetrafluoroethylene[solubility parameter ($\delta_p$):6.2(cal/cm$^3$)$^{\frac{1}{2}}$, hereinafter abbreviated as "6.2"], polychlorotrifluoroethylene(7.2), polybutadiene(8.40), polypropylene(8.02), polyethylene(8.56), polypropylene glycol (8.66), polymethylsiloxane(7.5), polyisoprene(8.10), polymethyl methacrylate(8.7), poly-t-butyl methacrylate(8.3), cellulose acetate(12.65;13.14;12.98), poly-p-phenylene terephthalate(15.89), aromatic polyhydrazide(16.25), polyvinyl alcohol(19.06) and regenerated cellulose(24.08). In case a combined membrane is used, its solubility parameter($\delta_p$) means the one of the chemical substance constituting the surface of a porous membrane. Even if a mean solubility parameter calculated from the mean composition of the polymeric substances constituting the porous membrane does not fall within the above described range, and when the surface of the porous membrane is chemically modified and the solubility parameter of the material substance constituting the modified surface of the porous membrane falls within the above described range, the porous membrane having such a solubility parameter can also be employed in the separation and condensation of organic liquids by ultrafiltration according to this invention. Of the hydrophilic porous membranes, regenerated cellulose porous membranes having a mean pore size($2\overline{ra}$) of from $5 \times 10^{-6}$ cm to $5 \times 10^{-4}$ cm are one type of especially preferred hydrophilic porous membranes judging from the permeation rate(J), the separation coefficient($\alpha$) and the usable range of composition of the feed in the state of one phase to be separated.

In conducting ultrafiltration using a combination of a hydrophilic porous membrane with a hydrophobic porous membrane according to this invention, it is preferred that in order to maintain a high permeation rate the feed in the state of phase separation is in an agitated state. Also in continuously conducting ultrafiltration in a state where the permeation rate(J) and the separation coefficient($\alpha$) are maintained high, it is preferred that the both types of the porous membranes are employed at the same time and the ultrafiltration is conducted using the both types of the porous membranes.

Further, when the amount of a selected organic liquid in a feed to be separated is one-sided, i.e., up to about 20% by weight or more than about 80% by weight, it is effective that the side of a polymeric porous membrane which is not contacting the feed to be separated and into which an organic liquid of the smaller amount permeates (for example, the chamber 202 or 203 in the filtering apparatus as illustrated in FIG. 5 which can be employed in this invention) is pressurized with a pressure balanced with the hydrostatic pressure difference($\Delta P$) so as not to allow a filtrate to permeate through the porous membrane and that ultrafiltration is successively conducted by continuously supplying the feed until there is no great difference in the liquid composition of the feed to the separated.

The polymeric porous membranes which can be employed in this invention may be in the shape of a flat membrane, a tubular or spiral membrane.

According to the fifth embodiment of the process of this invention, ethanol can be separated and condensed from an aqueous ethanol solution. More specifically, when a specified metal salt or ammonium salt is added to an aqueous ethanol solution to render the solution in tte state of phase separation, i.e., to separate the solution into an ethanol phase and an aqueous phase and then the ultrafiltration is conducted using at least one pair of a hydrophilic polymeric porous membrane and a hydrophobic polymeric porous membrane each having a $2\overline{ra}$ of at less 10$^{-6}$cm, the hydrophilic polymeric porous membrane selectively allows the aqueous phase to permeate while the hydrophobic polymeric porous membrane selectively allows the ethanol phase to permeate and as a result, ethanol can be easily separated and condensed from its dilute aqueous solution with hardly any consumption of energy. According to this process, the Pe is sufficiently great and the ethanol separation coefficient ($\alpha$) is at least 20.

In the membrane permeation of a feed a liquid having a higher water content selectively permeates through a hydrophilic polymeric porous membrane while a liquid having a lower water content selectively permeates through a hydrophobic polymeric porous membrane. In addition, even if the states of physical dispersion of two liquids as the separation state The respective solubility parameter is defined by "ENCYCIOPEDIA OF POLYMER SCIENCE AND TECHNOLOGY VOL. 3 P.834 (Ed. by H. F. MARK, N.G. GAYLORD and N.M. BILKALES, John Wiley & Sons, Inc., New York)" of two liquids are different, more specifically, whether a liquid having a higher water content is dispersed in a liquid having a lower water content or the liquid having a lower water content is dispersed in the liquid having a higher water content or the entire liquid is separated into two phases across only one interface, the selective permeability never changes and is constant, and a liquid having a higher water content can always be obtained through the hydrophilic polymeric porous membrane while a liquid having a lower water content can always be obtained through the hydrophobic polymeric porous membrane.

According to the present process of this invention an aqueous ethanol solution can be rendered in the state of phase separation by the addition thereto of at least one compound selected from the group consisting of (a) fluorides of an alkali metal such as potassium fluoride, (b) hydroxides of an alkali metal such as potassium hydroxide and sodium hydroxide, (c) sulfates of an alkali metal such as sodium sulfate, (d) carbonates of an alkali metal such as potassium carbonate and sodium carbonate, (e) thiosulfates of an alkali metal such as sodium thiosulfate, (f) sulfates of a metal having an ionic radius of at least 1.30 Å except an alkali earth metal and having a solubility in water at 25° C. of at least 10 g/100 ml such as manganese sulfate, aluminum sulfate and magnesium sulfate and (g) ammonium salts such as ammonium fluoride and ammonium sulfate. The amount of the above described compound which can be employed is not less than an amount which starts to cause the phase separation of an aqueous ethanol solution when the compound is added to the aqueous ethanol solution.

As the common properties these compounds are highly soluble in water and are hardly soluble in ethanol. Accordingly, in the two phase-separated liquids the relationship of distribution among water, ethanol and a third compound added to cause phase separation in the aqueous alcohol solution becomes as follows. Namely, a large amount of the third compound and a small amount of ethanol are dissolved in a liquid having a higher water content while a small amount of the third compound and a large amount of ethanol are dissolved in a liquid having a lower water content. When a compound selected from the above described groups (a), (b), (c), (d), (e), (f) and (g) is added to the aqueous ethanol solution in an amount of not less than the specified amount depending upon the concentration of ethanol in the aqueous ethanol solution, the kind of the compound selected and the temperature of the aqueous ethanol solution chosen, the aqueous ethanol solution is separated into a liquid containing water, most of the compound added and a small amount of ethanol (hereinafter referred to "aqueous phase") and a liquid containing most of ethanol, a small amount of water and a small amount of the compound added (hereinafter "ethanol phase").

For example, when a 50% by weight aqueous potassium solution is mixed at 25° C. with a 20% by weight aqueous ethanol solution, the mixed solution obtained immediately undergoes phase separation to form an aqueous phase having a composition of potassium:water:ethanol=52.8:46.9:0.3 at a weight ratio and an ethanol phase having a composition of potassium:water:ethanol=0.1:10.5:89.4 at a weight ratio. With two solutions having such compositions in the state of phase separation, the aqueous phase selectively permeates through a hydrophilic polymeric porous membrane while the ethanol phase selectively permeates through a hydrophobic polymeric porous membrane.

Using a polymeric porous membrane having a $2\overline{ra}$ of at least $10^{-6}$ cm, the Pe can be increased as large as possible within a range where the selectivity of a liquid capable of permeating through each of the porous membranes may be maintained, and such a high concentration that is unknown up to now can be rapidly carried out.

The polymeric material substance which constitutes a polymeric porous membrane and which allows the aqueous phase and the ethanol phase to selectively permeate, respectively, can be selected by its solubility parameter.

The polymeric material substances constituting the hydrophilic polymeric porous membranes which can be employed in the present process include, for example, those having a solubility parameter of at least 15 $(cal/cm^3)^{\frac{1}{2}}$ such as regenerated cellulose [$\delta_p$: 24.8 $(cal/cm^3)^{\frac{1}{2}}$, hereinafter abbreviated as "24.8"], polyvinyl alcohol (19.06), poly-p-phenylene terephthalamide (15.89) and aromatic polyhydrazide (16.25).

The polymeric material substances constituting the hydrophobic polymeric porous membranes which can be employed in the present process of this invention include, for example, those having a solubility parameter of at most 9 $(cal/cm^3)^{\frac{1}{2}}$ such as polytetrafluoroethylene [$\delta_p$: 6.2 $(cal/cm^3)^{\frac{1}{2}}$, hereinafter abbreviated as "6.2"], polchlorotrifluoroethylene (7.2), polybutadiene (8.40), polyprolylene (8.02), polyethylene (8.56), polypropylene glycol (8.66), polymethylsiloxane (7.5), polyisoprene (8.10), polyethyl methacrylate (9.0), poly-n-butyl methacrylate (8.7) and poly-t-butyl methacrylate (8.3).

Any combination of a hydrophilic polymeric porous membrane and a hydrophobic polymeric porous membrane may be employed if the solubility parameter of the polymeric material substance constituting the hydrophilic polymeric porous membrane and the solubility parameter of the polymeric material substance constituting the hydrophobic polymeric porous membrane are within the above described ranges, respectively. In order to increase the selectivity of the porous membrane and the Pe at the same time, it is preferred that the difference in solubility parameter between the polymeric material substances constituting the hydrophilic polymeric porous membrane and the hydrophobic polymeric porous membrane is increased.

As the hydrophilic polymeric porous membrane, regenerated cellulose having a solubility parameter belonging to a greatest group is preferred as the polymeric material substance. With regenerated cellulose porous membrane, ultrafiltration can be carried out without reducing the selectivity of the porous membrane for the aqueous phase in a wide range of its $2\overline{ra}$ of from $5 \times 10^{-6}$ cm to $1 \times 10^{-3}$ cm.

The $2\overline{ra}$ of a polymeric porous membrane is closely related with the pressure difference($\Delta P$) with respect to the separation efficiency and it is preferred that both the hydrophilic polymeric porous membrane and the hydrophobic polymeric porous membrane satisfy the following equation:

$$\Delta P \leq 4 \times 10^{-5}/\overline{ra} (cmHg) \tag{8}$$

Whatever state of physical dispersion the aqueous phase and the ethanol phase in the feed in phase separation may take, it is constant that one of the two phases selectively permeates through one of the hydrophilic polymeric porous membrane and the hydrophobic polymeric porous membrane. More specifically, the state of physical dispersion of the two phases, i.e., whether the aqueous phase is dispersed in the ethanol phase or the ethanol phase is dispersed in the aqueous phase or the entire liquid is separated into the two phases across only one interface, does not affect the selective permeability of the porous membrane. However, in order to attain a high Pe at a small pressure difference it is preferred that the aqueous ethanol solution in the state of phase separation is stirred. As to the stirring method, any stirring means generally employed and its any combination such as stirring by a rotating wane, an ultrasonic wave osillator, blowing a gas into the solution in the state of phase separation and blowing the solution in the state of phase separation by a pump can be employed in the process of this invention.

The advantages according to this process are as follows:

(a) Ethanol can easily be separated and condensed without consumption of a large amount of energy as in distillation.

(b) As the $2\bar{r}a$ of the polymeric porous membrane employed is as large as at least $10^{-6}$ cm, the J is extremely great.

(c) As the operational pressure is very low, the apparatus employed does not require a pressure-resistant structure.

(d) The structure of the apparatus employed is simple.

(e) As the separation can be conducted at a high efficiency (i.e., a high separation coefficient and a high separation rate), the apparatus employed can be made small-sized.

(f) As the selective permeation based on the affinity between the porous membrane and the separated phase is conducted, the separation can be carried out by the difference in the affinity between the phase-separated two phases even if there is no difference in gravity between them.

(g) As both ethanol and water can be removed from an aqueous ethanol solution, it is possible to continuously condense the aqueous ethanol solution.

According to the sixth embodiment of the process of this invention, ethanol can be separated and condensed from an aqueous ethanol solution. More specifically, when an entrainer is added to an aqueous ethanol solution to render the solution in the state of phase separation, i.e., the aqueous solution in the state of one phase is transformed into a solution in the state of phase separation having two liquids in the state of one phase, i.e., an entrainer phase and an aqueous phase, and then the ultrafiltration of the aqueous ethanol solution is conducted using at least one pair of a hydrophilic polymeric porous membrane and a hydrophobic polymeric porous membrane each having a $2\bar{r}a$ of at least $10^{-6}$ cm, the entrainer phase where the ratio of ethanol to water is extremely increased and the aqueous phase can be rapidly and completely separated at a sufficiently great J with hardly any consumption of energy. Further when the entrainer phase is subjected to distillation, anhydrous ethanol can easily be obtained.

According to the present process, in the membrane permeation of the two phases the aqueous phase selectively permeates through a hydrophilic polymeric porous membrane while the entrainer phase selectively permeates through a hydrophobic polymeric porous membrane. In addition, even if the states of physical dispersion of the two liquids are different in the state of phase separation of this invention, namely, whether the aqueous phase is dispersed in the entrainer phase, or the entrainer phase is dispersed in the aqueous phase or the entire liquid is separated into two phases across only one interface, the selective permeability of the membrane is constant, and the aqueous phase selectively permeates through the hydrophilic polymeric porous membrane and the entrainer phase selectively permeates through the hydrophobic polymeric substance. With $2\bar{r}a$ of less than $10^{-6}$ cm the J is remarkably reduced and the separate filtration of the aqueous phase and the entrainer phase cannot be carried out.

The entrainers which can be employed in this invention include organic liquids which are liquid and have a solubility in water at 25° C. of at most 1% by weight, a solubility in ethanol at 25° C. of at least 50% by weight and a boiling of not higher than 200° C. The amount of the entrainer which can be employed is not less than an amount which starts to cause the phase separation of an aqueous ethanol solution when the entrainer is added to the aqueous ethanol solution.

Exemplary organic liquids include benzene, toluene, allyethyl ether, isobutyl chloride, benzyl chloride, diethyl oxaloacetate, 2-octanone, ethyl o-acetate, oleic acid, α-chloro-m-xylene, α-chloro-p-xylene, ethyl chloroacetate, 2-chloropyridine, geraniol, allyl acetate, t-butyl acetate, diallyl ether, cyclopentane, diphenyl hydrazine, N,N-butylaniline, dipentene, cis-1,3-dimethylcyclohexane, ethyl thiocyanate, tetramethyl lead, α-terpinene, β-terpinene, terpinolene, ethyl trichloroacetate, o-tolunitrile, benzylidenenonanol dichloride, o-xylene, m-xylene, p-xylene, 1-phenyl-1-butanone, propiophenone, methyl propionate, α-bromo-xylene, 2-methylpyrrole, N-methylpyrrole, 6-methyl-5-heptene-2-one, allyl iodide, isobutyl iodide, 1-iodonaphthalene, α-limonene, diallyl sulfide, diethyl sulfide and tri-m-tolyl phosphate and any mixtures thereof.

As the common properties these organic liquids are hardly soluble in water and are extremely soluble in ethanol. Accordingly the relationship of distribution among water, ethanol and an entrainer in the aqueous alcohol solution in the state of phase separation becomes as follows. Namely, a large amount of water, a small amount of ethanol and a very small amount of the entrainer are dissolved in the aqueous phase, and a large amount of the entrainer, a small amount of ethanol and a very small amount of water are dissolved in the entrainer phase. When the ratio of ethanol to water in the two phases is compared, the ratio of ethanol to water in the entrainer phase is characteristically much higher than that in the aqueous phase. Thus it is possible to remarkably increase the ratio of ethanol to water in a short period of time with almost no energy consumed by adding an entrainer to separate the aqueous ethanol solution into the two phases and rapidly separating one phase from the other with a polymeric porous membrane.

Since the entrainer phase is a 3-component mixture, anhydrous ethanol can be easily isolated by distillation. More specifically, a 3component azeotrope having a lowest boiling point is firstly distilled and secondly an azeotrope of ethanol and water is distilled.

In addition, when an aqueous ethanol solution is rendered in the state of phase separation to obtain an aqueous phase and an ethanol phase, it is possible to add (i) an azeotrope of ethanol and water, (ii) an azeotrope of ethanol and an entrainer or (iii) an azeotrope of ethanol, water and an entrainer to the aqueous ethanol solution to cause phase separation.

For example, when the phase-separated entrainer phase is rapidly separated by a porous membrane and then subjected to distillation to obtain anhydrous ethanol, the above described azeotropes (ii) and (iii) can be obtained as the distillates. On the other hand, when the aqueous phase is subjected to distillation, the above described azeotropes (i) and (iii) can be obtained as the distillates. Thus by adding the azeotropes (i), (ii) and (iii) to the aqueous ethanol solution, the entrainer can be efficiently recovered and re-used.

The polymeric material substances constituting the polymeric porous membranes capable of selectively allowing the aqueous phase and the entrainer phase to permeate, respectively can be selected by their solubility parameters.

The polymeric material substances constituting the hydrophilic polymeric porous membranes which can be employed in the present process include, for example, those having a solubility parameter of at least about 15 (cal/cm$^3$)$^{\frac{1}{2}}$ such as regenerated cellulose [$\delta_p$: 24.8 (cal/cm$^3$)$^{\frac{1}{2}}$, hereinafter abbreviated as "24.8 ."], polyvinyl alcohol (19.06), poly-p-phenylene terephthalamide (15.89) and aromatic polyhyrazide (16.25).

The polymeric material substances constituting the hydrophobic polymeric porous membranes which can be employed in the present process of this invention include, for example, those having a solubility parameter of at most 9 (cal/cm$^3$)$^{\frac{1}{2}}$ such as polytetrafluoroethylene [$\delta_p$: 6.2 (cal/cm$^3$)$^{\frac{1}{2}}$, hereinafter abbreviated as "6.2"], polychlorotrifluoroethylene (7.2), polybutadiene (8.40), polypropylene (8.02), polyethylene (8.56), polypropylene glycol (8.66), polymethylsiloxane (7.5), polyisoprene (8.10), polyethyl methacrylate (9.0), poly-n-butyl methacrylate (8.7) and poly-t-butyl methacrylate (8.3).

Any combination of a hydrophilic polymeric porous membrane and a hydrophobic polymeric porous membrane may be employed if the $\delta_p$ of the polymeric material substance constituting the hydrophilic polymeric porous membrane and the $\delta_p$ of the polymeric material substance constituting the hydrophobic polymeric porous membrane are within the above described ranges, respectively. In order to increase the selectivity of the porous membrane and the Pe at the same time, it is preferred that the difference in $\delta_p$ between the polymeric material substances constituting the hydrophilic polymeric porous membrane and the hydrophobic polymeric porous membrane, respectively is increased.

As the hydrophilic polymeric porous membrane, regenerated cellulose having a solubility parameter belonging to a greatest group is preferred as the polymeric material substance. With regenerated cellulose porous membrane, ultrafiltration can be carried out without reducing the selectivity of the membrane for the aqueous phase in a wide range of its $2\bar{r}a$ of from $5 \times 10^{-6}$ cm to $5 \times 10^{-6}$ cm.

The $2\bar{r}a$ of a polymeric porous membrane is closely related with the pressure difference ($\Delta P$) for the separation efficiency and it is preferred that both the hydrophilic polymeric porous membrane and the hydrophobic polymeric porous membrane satisfy the above described equations (1), (2) and (3).

Whatever state of physical dispersion the aqueous phase and the ethanol phase in the feed in phase separation may take, it is constant that one of the two phases selectively permeates through one of the hydrophilic polymeric porous membrane and the hydrophobic polymeric porous membrane. More specifically, the state of physical dispersion of the two phases, i.e., whether the aqueous phase is dispersed in the ethanol phase or the ethanol phase is dispersed in the aqueous phase or the entire liquid is separated into the two phases across only one interface, does not affect the selective permeability of the membrane. However, in order to attain a high Pe at a small effective pressure it is preferred that the aqueous ethanol solution in the state of phase separation is stirred. As the stirring method any stirring means generally employed and its any combination such as stirring by a rotating wane, an ultrasonic wave osillator, blowing a gas into the solution in the state of phase separation and blowing the solution in the state of phase separation by a pump can be employed in the process of this invention.

The advantages of the present process are as follows:

(a) By adding an entrainer to a dilute aqueous ethanol solution to cause phase separation, the ratio of ethanol to water can be increased without energy consumption.

(b) As the $2\bar{r}a$ of the porous membrane employed is as large as at least $10^{-6}$ cm, the J is extremely great.

(c) As the operational pressure is very low, the apparatus employed does not require a pressure-resistant structure.

(d) As the structure of the apparatus employed is very simple and, in addition, the $\alpha$ is very large, the apparatus employed can be remarkably made small-sized.

(e) As the selective permeability is determined by the difference in affinity between the porous membrane and the organic liquid phase to be separated, the separation can be easily carried out by the difference in affinity between the two phases even if there is no difference in gravity between them.

(f) By distilling the entrainer phase there can be obtained anhydrous ethanol.

(g) By distilling the aqueous phase, water can be removed.

(h) By adding a water-ethanol azeotrope, a water-ethanol-entrainer azeotrope and/or an ethanol-entrainer produced by distilling the aqueous phase and the entrainer phase, respectively, obtained by the membrane filtration, to an aqueous ethanol solution as a new feed to cause phase separation, ethanol can be continuously condensed from the aqueous ethanol solution while separating the entrainer phase from the aqueous phase with the porous membrane.

BRIEF DESCRIPTION OF THE DRAWING

FIG. 4 illustrates a still further embodiment of a vertical-type filtering apparatus employed in the process of this invention in which the numbered elements 101 to 111 are the same as in FIG. 3.

FIG. 5 illustrates another embodiment of a horizontal-type filtering apparatus employed in the process of this invention in which the numbered elements are as follows: 201, a chamber for a feed; 202, a chamber for a filtrate; 203, a chamber for a filtrate; 204, a hydrophilic polymeric porous membrane; 205, a hydrophobic polymeric membrane; 206, an inlet for a feed; 207, an inlet for a liquid (B); 208, a pressure source; 209, a rotor provided in the lower part of the chamber 201; 210, an outlet for the filtrate in the chamber 202, 211, a cock at the outlet 210; 213, an outlet for the filtrate in the chamber 203; 214, a cock at the outlet 213; and 215, mesh supporters for the membranes 204 and 205.

Methods for Measuring Parameters to be Used Specifying the Properties of the Present Invention A. Mean Pore Size ($2\overline{r_a}$)

Pure water is filtered at 25° C. with a polycarbonate porous membrane having a pore size of 0.2 $\mu$m("NUCLEPORE", a product of General Electric Co., Ltd.) to give pure water without fine particles. Using the water thus obtained a permeation rate [J(cm/sec)] unit area of a sample porous membrane is measured at a constant pressure difference [$\Delta P$(cmHg).]The mean pore size [$2\overline{r_a}$(cm)] is calculated from the following equation:

$$2\overline{r_a} = 4.6 \times 10^{-2} \sqrt{\frac{j \cdot d \cdot \eta_w (cm)}{Pr \cdot \Delta P}} \quad (11)$$

wherein $\eta_w$ is a viscosity of pure water and is usually 1 centipoise, d is a thickness of the membrane and is measured with a micrometer, Pr is a porosity of the membrane as defined below.

B. Porosity (Pr)

The apparent density($\rho_a$) of a sample porous membrane is measured and a porosity [Pr(%)] is calculated from the following equation:

$$Pr(\%) = (1 - \rho_a/\rho_p) \times 100\% \quad (12)$$

wherein $\rho_p$ is a density of the substance constituting the membrane, $\rho_a$ is calculated by measuring a thickness [d(cm)], a weight [W(g)] and an area [S (cm²)] of the membrane in accordance with the equation $\rho_a = W/S \cdot d$.

C. Separation Coefficient($\alpha$)

The concentration of components in a feed or a filtrate is measured by a gas chromatograph (GC4M-Type, manufactured by Shimadzu Seisakusho Ltd.).

$$\alpha = \frac{\dfrac{\text{concentration of selected liquid by weight \% in filtrate}}{\left(\dfrac{\text{concentration of i-component by weight \% in } \sum_i \text{filtrate}}\right)} - \left(\dfrac{\text{concentration of selected liquid by weight \% in filtrate}}\right)}{\dfrac{\text{concentration of selected liquid by weight \% in feed}}{\left(1 - \dfrac{\text{concentration of selected liquid by weight \% in feed}}\right)}}$$

wherein i-component means all the components in the feed.

D. Permeability Coefficient (Pe)

Figure 1:
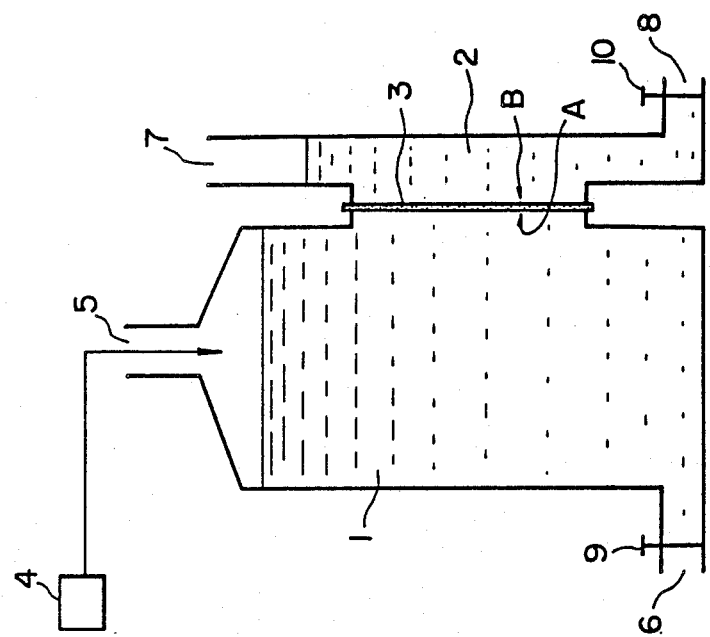
FIG. 1 illustrates one embodiment of a horizontal-type filtering apparatus employed in the process of the present invention in which the numbered elements are as follows: 1, a chamber for a feed; 2, a chamber for a liquid (B); 3, a polymeric porous membrane; 4, a pressure source; 5, an inlet for the feed; 6, an outlet for the feed; 7, an inlet for the liquid (B); 8, an outlet for the liquid (B) and a filtrate; 9, a cock at the outlet 6; 10, a cock at the outlet 8; A is the surface of the polymeric porous membrane 3 facing the chamber 1; and B is that facing the chamber 2.

A permeability coefficient [Pe(cm²/sec.cmHg)] is calculated by conducting ultrafiltration with use of the filtering apparatus as illustrated in FIG. 1 according to the following equation:

$$Pe = \frac{V \cdot d}{\Delta P \cdot S} \text{ (cm}^2\text{/sec. cmHg)}$$

wherein

V(cm³/sec) is a filtration rate,
d(cm) is a thickness of the membrane,
$\Delta P$(cmHg) is a pressure difference between the feed and the filtrate and
S(cm²) is an effective filtration area.

A further understanding of the present invention, and the advantages thereof, can be had by reference to the following examples.

EXAMPLE 1

Cellulose linter having a viscosity average molecular weight of $2.4 \times 10^{-5}$ was dissolved in a cuprammonium solution containing 6.8% by weight of ammonia and 3.1% by weight of copper prepared by the conventional method at a varied concentration of 4 to 12% by weight, and 13% by weight of acetone was added to the solution obtained and stirred. Then the solution was cast on a glass plate by an applicator at 30° C. in an atmosphere where the concentration of acetone vapor atmosphere at 20° C. was 70% and left to stand for 60 minutes in the same atmosphere. Then the membrane formed on the glass plate was immersed in a 2% by weight aqueous sulfuric acid solution at 20° C. for 15 minutes to regenerate the cellulose and then washed with water. Then the water in the membrane was removed with a sheet of filter paper and the membrane was immersed in acetone at 20° C. for 15 minutes to exchange the water in the membrane with acetone and dried by inserting the membrane between two sheets of filter paper at 30° C. in the air to give a regenerated cellulose porous membrane having a mean pore size ($2\bar{r}a$) of 0.2 μm, a porosity (Pr) of 67% and a thickness(d) of 30 μm. For further details of making such regenerated cellulose porous membranes that can be employed in this invention, refer to Application "POROUS REGENERATED CELLULOSE MEMBRANE AND PROCESS FOR THE PREPARATION THEREOF", filed simultaneously herewith (corresponding to Japanese Patent Application Nos. 187795~187798/1981, filed Nov. 25, 1981, and Nos. 155106 and 155107/1982, filed Sept. 8, 1982; U.S. patent application Ser. No. 443,074, filed 11-19-82.)

Ethanol having a viscosity ($\eta$) at 25° C. of $1.1_{cp}$ as a liquid to be separated was mixed with methylcyclohexane at an arbitrary ratio to thermodynamically form a liquid of one phase.

A 47 m/m pressure filter holder (manufactured by Millipore Ltd.) was employed as an ultrafiltration membrane holder. In this case the effective membrane area (S) was about 10 cm².

The operation pressure is selected so as to satisfy the equations (1) and (2) from the relationship between permeation rate (J) and separation coefficient ($\alpha$). In this Example, the pressure and the J were adjusted to 0.3 cmHg and $7 \times 10^{-5}$ cm³/sec.cm², respectively. The analysis of the filtrate after separation was carried out by gas chromatography using a packing (PEG-20M) and measurement of refractive index.

The regenerated cellulose porous membrane as obtained above was swollen with water and fixed in the pressure filter holder and 30 ml of a mixture of ethanol and methylcyclohexane containing 20% by weight of methanol was charged as a feed to be filtered onto the upper part of the membrane fixed and the composition of the filtrate having permated through the membrane was analyzed. The pressure of the feed on the membrane was 0.3 cmHg.

Further, the above described procedures were repeated without the swelling treatment with water, and the conventional pressure filtration was conducted under a pressure of 38.0 cmHg by a compressor. All the operations were carried out at 25° C. The results are shown in Table 1.

TABLE 1

| Separation Method | [Present Process Swelling Treatment] Yes | No | Conventional Process*1 |
|---|---|---|---|
| Pressure Difference (ΔP) (cmHg) | 0.3 | 0.3 | 38.0 |
| Separation Coefficient (α) | 65.3 | 0.9 | 1.0 |
| Permeability Coefficient (Pe) (cm²/sec · cmHg) | $2.0 \times 10^{-7}$ | $7.7 \times 10^{-7}$ | $6.5 \times 10^{-6}$ |
| Amount of Ethanol in Filtrate(weight %) | 94.0 | 18.0 | 20.0 |

TABLE 1-continued

| Separation Method | [Present Process Swelling Treatment] Yes | No | Conventional Process*1 |
|---|---|---|---|
| Filtrate(weight %) | | | |

Note:
*1Comparative Example

As is clear from Table 1, in the conventional process, the $\alpha$ is 1 since the equation (1) is not satisfied. In the present process the $\alpha$ is greater when the swelling treatment is carried out.

EXAMPLE 2

The same regenerated cellulose porous membrane as in Example 1 was subjected to the swelling treatment with water. Acetone having an $\eta$ of $0.3_{cp}$ was separated and condensed from its mixture with cyclohexane containing 29.3% by weight of ethanol using the membrane in the same manner as in Example 1.

The composition of the filtrate obtained was analyzed by the measurement of refractive index. The results are shown in Table 2.

TABLE 2

| Separation Method | Present Process | Conventional Process*1 |
|---|---|---|
| Pressure Difference[ΔP(cmHg)] | 0.3 | 38.0 |
| Separation Coefficient(α) | 23.2 | 1.0 |
| Permeability Coefficient(Pe) [cm²/(sec · cmHg)] | $2.6 \times 10^{-7}$ | $6.5 \times 10^{-6}$ |
| Amount of Acetone in Filtrate(weight %) | 90.6 | 29.3 |

Note:
*1Comparative Example: The same conventional method as in Comparative Example of Example 1 was employed.

EXAMPLE 3

Figure 2:
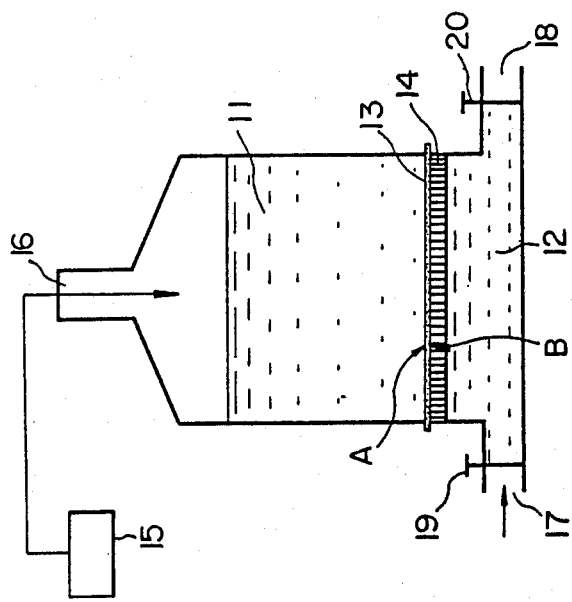
FIG. 2 illustrates another embodiment of a vertical-type filtering apparatus employed in the process of this invention in which the numbered elements are as follows: 11, a chamber for a feed; 12, a chamber for a liquid (B); 13, a polymeric porous membrane; 14, a mesh supporter for the membrane 13; 15, a pressure source; 16, an inlet for the feed; 17, an inlet for the liquid (B); 18, an outlet for the liquid (B); 19, a cock at the inlet 17; 20, a cock at the outlet 18; A is the surface of the polymeric porous membrane 13 facing the chamber 11; and B is that facing the chamber 12.

In the filtering apparatus as illustrated in FIG. 2, a cellulose acetate porous membrane having an acetyl content 60.0% prepared according to the method described in Example 2, Sample 2 of U.S. Pat. No. 3,883,626 was fixed and as a liquid (B) water was employed. A mixture of methylcyclohexane and ethanol at a weight ratio of 4:1 as a feed was charged in the chamber 1 while water was charged in the chamber 2, and the height of the liquid surface of the feed was made equal to that of the water. Then the feed was pressurized by a compressor as a pressure source 4 so as to obtain the same pressure difference (ΔP) between the chambers 1 and 2, and the amount of a filtrate having permeated through the membrane into the chamber 2 was measured from the amount of an effluent at the cock 10. The $\alpha$ was calculated from the composition of the liquid in the chamber 2. With various ΔP, Pe and $\alpha$ were obtained. The results are shown in Table 3.

TABLE 3

| Relationship between Pressure Difference Loaded on Membrane and α, Pe | | | |
|---|---|---|---|
| Run No. | ΔP (cmHg) | α | Pe (cm/sec · cmHg) |
| 1 | 0.07 | 8.2 | $6.4 \times 10^{-7}$ |
| 2 | 0.30 | 7.8 | $6.6 \times 10^{-7}$ |
| 3 | 1.0 | 7.1 | $7.1 \times 10^{-7}$ |
| 4*1 | 4.0 | 1.0 | $5.9 \times 10^{-6}$ |
| 5*1 | 8.0 | 1.0 | $6.1 \times 10^{-6}$ |

Note:
*1Comparative Examples

As is clear from Table 3, when the ΔP does not satisfy the equations (1) to (3), the $\alpha$ is 1.0. Also the Pe is in the range of $10^{-7}$ to $10^{-6}$ (cm²/sec.cmHg) and these values are $10^3 \sim 10^4$ times as large as the conventional values by the pervaporation method.

EXAMPLE 4

In the same manner as in Example 1 regenerated cellulose porous membranes having various $\overline{2r_a}$ were prepared and each of them was fixed as a polymeric porous membrane 13 in the vertical-type filtering apparatus as in FIG. 2. Water was employed as a liquid (B) and a mixture of methylcyclohexane and ethanol at a weight ratio of 4:1 was employed as a feed and the ultrafiltration of the feed was conducted at a pressure difference (ΔP) loaded on the membrane of 1.0 cmHg. In this ultrafiltration the density of water was greater than that of the feed and the membrane was swollen with water. The $\alpha$ and the Pe were obtained from the composition of a filtrate obtained and the permeation rate (J). The results and the characteristic features of the membranes are shown in Table 4.

As is clear from Table 4, when the $\overline{2r_a}$ is not higher than $1\times10^{-6}$ cm or $4\times10^{-4}$ cm, the $\alpha$ becomes one. The dependence of the Pe and the $\alpha$ on the pore size is comparatively small within the range of this invention. This means that the principle of the process of this invention is different from the dispersion mechanism of molecules in a membrane or the Poiseuille's flow of continuous fluid.

TABLE 4

Relationship between $\overline{2r_a}$ and $\alpha$, Pe

| | Regenerated Cellulose Porous Membrane | | | Separation | Permeability |
|---|---|---|---|---|---|
| Run No. | Mean Pore Size [$\overline{2r_a}$(cm)] | Thickness [d(cm)] | Porosity [Pr(%)] | Coefficient ($\alpha$) | Coefficient [Pe(cm²/sec · cmHg)] |
| 1*¹ | $<1\times10^{-6}$ | $2.6\times10^{-3}$ | 42 | about 1.0 | $<10^{-11}$ |
| 2 | $1.5\times10^{-6}$ | $3.0\times10^{-3}$ | 60 | 8.2 | $2.2\times10^{-7}$ |
| 3 | $5.2\times10^{-6}$ | $3.1\times10^{-3}$ | 65 | 7.6 | $5.5\times10^{-7}$ |
| 4 | $1.7\times10^{-5}$ | $3.2\times10^{-3}$ | 70 | 6.8 | $1.9\times10^{-6}$ |
| 5*¹ | $4\times10^{-4}$ | $3.3\times10^{-3}$ | 75 | 1.0 | $9.8\times10^{-6}$ |

Note:
*¹Comparative Examples

EXAMPLE 5

In the filtering apparatus as illustrated in FIG. 2, each of a regenerated cellulose porous membrane prepared in the same manner as in Example 1, a polyvinyl chloride porous membrane prepared in the same manner as in Example 2 of Japanese Patent Publication No. 7724/1981 and a polypropylene porous membrane prepared in the same manner as described in Example 4 of Japanese Patent Publication (OPI) No. 131028/1980 was fixed as the polymeric porous membrane 13 and the ultrafiltration of a feed set forth in Table 5 was conducted at 25° C. at a pressure difference (ΔP) of 1 cmHg. The Pe and the $\alpha$ obtained are shown in Table 5.

TABLE 5

$\alpha$ and Pe with Various Porous Membranes

| Polymeric Substance Constituting Porous Membrane | Regenerated Cellulose | Polyvinyl Chloride | Polypropylene |
|---|---|---|---|
| | $(24.08)^{*1}$ | $(9.6)^{*1}$ | $(8.02)^{*1}$ |
| 2ra(cm) | $2.2\times10^{-5}$ | $2.1\times10^{-5}$ | $2.5\times10^{-5}$ |
| Pr(%) | 71 | 74 | 69 |
| d(cm) | $3.4\times10^{-3}$ | $2.1\times10^{-2}$ | $4.0\times10^{-3}$ |
| Composition of Feed (weight ratio) | Acetone/ Benzene (1/1) | Acetone/ Benzene (1/1) | Acetone/ Benzene (1/1) |
| Liquid(B) | Water | Water | Water |
| $\alpha^{*2}$ | $5.43^{*3}$ | 5.02 | 0.21 |
| Pe(cm²/sec · cmHg) | $6.1\times10^{-6}$ | $5.2\times10^{-6}$ | $7.9\times10^{-6}$ |
| Remarks | Mixing of water in feed | No-mixing | No-mixing |

Notes:
*¹Solubility parameter $\delta_p[(cal/cm^3)]^{\frac{1}{2}}$
*²$\alpha$ was calculated with respect to acetone as the desired liquid in the filtrate.
*³Immediately after filtration.

As is clear from Table 5, with the polyvinyl chloride porous membrane acetone is condensed in the filtrate and with the polypropylene porous membrane benzene is condensed in the filtrate. With the regenerated cellulose porous membrane, due to the mixing of water in the feed the feed becomes a three-component solution of acetone, benzene and water and the concentration of the benzene in the feed is complicated.

EXAMPLE 6

In the filtering apparatus as illustrated in FIG. 2, each of the commercially available polytetrafluoroethylene porous membranes (Membrane Disc Filter of Teflon "FGLP04700", a product of Millipore Corporation) was fixed as the polymeric porous membrane 13 and the ultrafiltration of a feed set forth in Table 6 was conducted at 25° C. at a pressure difference (ΔP) of 1 cmHg. The Pe and the $\alpha$ obtained are shown in Table 6.

TABLE 6

| Polymeric Substance Constituting Porous Membrane | Polytetrafluoroethylene | Polytetrafluoroethylene |
|---|---|---|
| 2ra(cm) | $2.1\times10^{-5}$ | $2.4\times10^{-5}$ |
| Pr(%) | 73 | 75 |
| d(cm) | $3.0\times10^{-3}$ | $3.2\times10^{-3}$ |
| Composition of Feed (weight ratio) | Acetic acid/Benzene (1/1) | Ethanol/n-Hexane (1/1) |
| Liquid(B) | Water | Water |
| $\alpha^{*1}$ | 5.66 | 6.32 |
| Pe(cm²/sec · cmHg) | $6.6\times10^{-6}$ | $6.1\times10^{-6}$ |
| Remarks | No-mixing | No-mixing |

Note:
*¹$\alpha$ was calculated with respect to benzene or n-hexane as the desired liquid in the filtrate.

As is clear from Table 6, acetic acid or ethanol is condensed in the filtrate.

EXAMPLE 7

Figure 3:
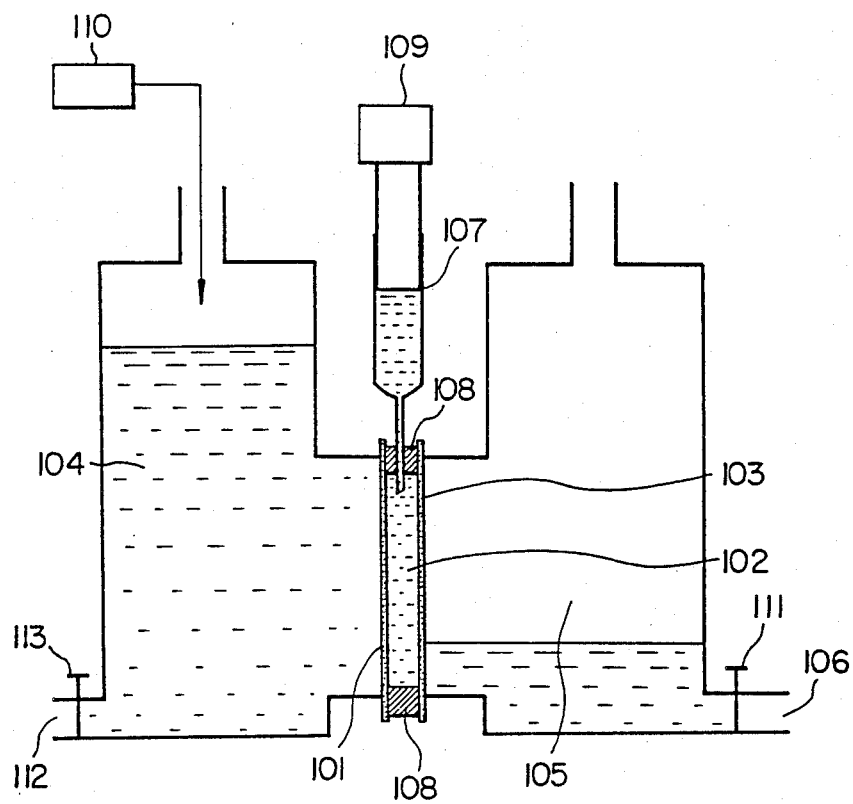
FIG. 3 illustrates a further embodiment of a horizontal-type filtering apparatus employed in the process of the present invention in which the numbered elements are as follows: 101, a polymeric porous membrane (X); 102, a chamber for a liquid (B); 103, a polymeric porous membrane (Y); 104, a chamber for a feed; 105, a chamber for a filtrate; 106, an outlet for the filtrate; 107, a cylinder for adding the liquid (B); 108, packings; 109, a balance weight for controlling pressure; 110, a pressure source; 111, a cock at the outlet 106; 112, an outlet for the feed; and 113, a cock at the outlet 112.

In the filtering apparatus as illustrated in FIG. 3, cellulose acetate porous membranes having a 2r̄a of $1.2 \times 10^{-5}$ cm, a Pr of 68% and a d of $3.1 \times 10^{-3}$ cm prepared in the same manner as in Example 3 of U.S. Pat. No. 3,883,626 were fixed as the polymeric porous membranes (X) and (Y). The thickness of a liquid (B) was adjusted by that of the packings 108. Water was employed as the liquid (B) and a mixture of methylcyclohexane and ethanol at a weight ratio of 4:1 was employed as a feed, and ethanol was condensed. The feed was pressurized and loaded with a pressure of ΔPt set forth in Table 7 and the weight (W) was controlled to produce a pressure of the liquid (B) of ΔPt/2. The amount of the filtrate from the outlet 106 was measured and the composition of the filtrate was analyzed by gas chromatography and then the permeability coefficient (Pe) and the separation coefficient (α) were obtained. The results are shown in Table 7.

TABLE 7

Relationship between Pressure Difference Loaded on Membranes (ΔPt) and α, Pe

| Run No. | Pressure Difference Loaded on Membrane (cmHg) | Separation Coefficient (α) | Permeability Coefficient [Pe(cm²/sec · cmHg)] |
|---|---|---|---|
| 1 | 0.1 | 36.1 | $5.2 \times 10^{-7}$ |
| 2 | 0.5 | 33.1 | $5.8 \times 10^{-7}$ |
| 3 | 2.0 | 24.1 | $6.1 \times 10^{-7}$ |
| 4* | 8.0 | 1.0 | $6.2 \times 10^{-6}$ |
| 5* | 16.0 | 1.0 | $6.4 \times 10^{-6}$ |

Note:
*Comparative Examples

As is clear from Table 7, when the P(=ΔPt/2) does not satisfy the equation (3), the α becomes 1.0. Under the conditions within the range of this invention the α is at least 20 and the Pe is in the range of $10^{-7}$ to $10^{-6}$ (cm²/sec. cmHg) and these values are $10^3 \sim 10^4$ times as large as the conventional values obtained by the pervaporation method. Further, the water content in the filtrates is 10% by weight to 20% by weight and the amount of the liquid (B) mixed in the filtrates through the membrane (X) is remarkably reduced.

EXAMPLE 8

In the filtering apparatus as illustrated in FIG. 3, polyethylene porous membranes having a 2r̄a of $3.1 \times 10^{-5}$ cm, a Pr of 67 % and a d of $4.2 \times 10^{-3}$ cm prepared in the same manner as described in Japanese Patent Application (OPI) No. 131028/1980 were fixed as the polymeric porous membranes (X) and (Y) in the same manner as in Example 7. Water was employed as a liquid (B) and a mixture of methylcyclohexane and ethanol at a weight ratio of 4:1 was subjected to ultrafiltration in the same manner as in Example 7. When the pressure difference (ΔPt) loaded on the membranes was 1.0 cmHg, the Pe and the α were $8.5 \times 10^{-6}$ (cm²/sec.cmHg) and 0.12, respectively. The concentration of methylcyclohexane in the filtrate was 97% and the water content in the filtrate was not higher than 0.5% and the mixing of the liquid (B) into the filtrate through the membrane (Y) was completely achieved.

EXAMPLE 9

In the same manner as in Example 1 regenerated cellulose porous membranes having various 2r̄a were prepared and each of them was employed as the polymeric porous membrane (X). Also polypropylene porous membranes having various 2r̄a were prepared by the conventional method and each of them was employed as the polymeric porous membrane (Y). In the filtering apparatus as illustrated in FIG. 4 the membranes (X) and (Y) were fixed in the same manner as in Example 7 and as a feed a mixture of benzene and ethanol at a weight ratio of 1:1 was employed, and as a liquid (B) water contained in filtering paper was employed. The pressure difference (ΔPt) was adjusted to 2.0 cmHg and the pressure of the liquid (B) was ΔPt/2. The composition of the filtrate was analyzed by gas chromatography and then the α and the Pe were calculated from the composition of the filtrate and the permeation rate (J). The results are shown in Table 8. It can be understood from these results that the dependence of Pe and α on the pore size of the porous membranes within the range of this invention is comparatively small and that the water content in the filtrate is 5% by weight to 15% by weight and ethanol is remarkably concentrated.

TABLE 8

Relationship between 2r̄a and α, Pe

| | Regenerated Cellulose Porous Membrane (X) | | | Polypropylene Porous Membrane (Y) | | | Separation Coefficient (α) | Permeability Coefficient [Pe(cm²/sec · cmHg)] |
|---|---|---|---|---|---|---|---|---|
| Run No. | Mean Pore Size [2r̄a(cm)] | Thickness [d(μm)] | Porosity [Pr(%)] | More Pore Size [2r̄a(cm)] | Thickness [d(μm)] | Porosity [Pr(%)] | | |
| 1*¹ | $<1 \times 10^{-6}$ | 26 | 45 | $<1 \times 10^{-6}$ | 22 | 15 | —*² | $<10^{-9}$ |
| 2 | $1.4 \times 10^{-6}$ | 30 | 62 | $1.5 \times 10^{-6}$ | 32 | 62 | 7.3 | $5.6 \times 10^{-7}$ |
| 3 | $1.6 \times 10^{-5}$ | 31 | 71 | $1.7 \times 10^{-5}$ | 34 | 70 | 7.2 | $1.4 \times 10^{-6}$ |
| 4*¹ | $4.1 \times 10^{-4}$ | 34 | 76 | $4.0 \times 10^{-4}$ | 34 | 74 | 1.0 | $1.0 \times 10^{-5}$ |

Note
*¹Comparative Examples
*²The concentrations of ethanol and benzene were low and could be evaluated.

EXAMPLE 10

In the same manner as in Example 1 regenerated cellulose porous membranes having different 2r̄a set forth in Table 9 were prepared and also polypropylene porous membranes having different 2r̄a were prepared in the same manner as in Example 5. In the filtering apparatus as shown in FIG. 5, each of the regenerated cellulose porous membranes as obtained above was fixed as a hydrophilic polymeric porous membrane 204 and each of the polypropylene porous membranes as obtained above was fixed as a hydrophobic polymeric porous membrane 205. A mixture of benzene and ethanol at a weight ratio of 1:1 was employed as a feed in the state of one phase and charged into a chamber 201 having a volume of 50 ml at a rate of 0.56 g/min. from an inlet 206 for the feed, and water was charged as a liquid(B) into the chamber 201 from an inlet 207 for the liquid(B) at a mixing ratio of the feed to the liquid(B) of 1:0.4 at the inlet 206 and 207. As a result, in the chamber 201 the resulting composition of the feed in the state of phase separation was the one obtained by adding water to the feed at a weight ratio of 0.4:1. Then the feed in the state of phase separation having this composition was stirred with a rotor 209 and a pressure was loaded on the membranes 204 and 205 by a compressor as a pressure source 208. Ultrafiltration was carried out at a constant condition of $\Delta P_1 = \Delta P_2 = 1.2$ cmHg, and the filtrate in the chamber 202 having permeated through the membrane 204 and the filtrate in the chamber 203 having permeated through the membrane 205 were collected from outlets 210 and 213, respectively and their compositions were analyzed by gas chromatography. In the ultrafiltration the permeation rate(J) did not change with the passage of time. The results are shown in Table 9.

TABLE 9

| Run No. | Regenerated Cellulose Porous Membrane | | Polypropylene Porous Membrane | | Composition of Filtrates [Benzene/Ethanol/Water (weight %)] | |
|---|---|---|---|---|---|---|
| | $2\bar{r}a$ (cm) | Pr (%) | $2\bar{r}a$ (cm) | Pr (%) | Filtrate in Chamber 202 | Filtrate in Chamber 203 |
| 1 | $<10^{-6}$ | 40 | $<10^{-6}$ | 20 | — | — |
| 2 | $2 \times 10^{-6}$ | 63 | $2.2 \times 10^{-6}$ | 71 | 16/53/31 | 80/17/3 |
| 3 | $3 \times 10^{-5}$ | 72 | $3.1 \times 10^{-5}$ | 70 | 17/54/29 | 79/18/3 |
| 4 | $6 \times 10^{-4}$ | 72 | $5.8 \times 10^{-4}$ | 73 | 30/50/20 | 50/40/10 |

Note:
Thickness of all the membranes employed: about 40 μm Effective membrane area(S): about 10 cm$^2$ With a $2\bar{r}a$ of less than $10^{-6}$ cm, a filtrate could hardly be collected. In this case the permeability coefficient Pe was less than $10^{-8}$ cm$^2$/sec.cmHg and markedly small compared with $8.2 \times 10^{-7}$ cm$^2$/sec.cmHg), $1.4 \times 10^{-6}$ (cm$^2$/sec. cmHg) and $6.9 \times 10^{-5}$ cm$^2$/sec. cmHg at a $2\bar{r}a$ of $2 \times 10^{-6}$ cm, $3'10^{-5}$ cm and $6 \times 10^{-4}$ cm, respectively. At a $2\bar{r}a$ of $6 \times 10^{-4}$ cm the difference between the compositions of the filtrates in the chamber 202 and 203 was small. When methanol was employed as the liquid(B), phase separation of the feed did not occur. In this case there was no difference between the filtrates in the chambers 202 and 203.

Further when the regenerated cellulose porous membranes were employed as the membranes 204 and 205, the compositions of the filtrates in the chambers 202 and 203 were nearly equal and at the initial period of the ultrafiltration the weight ratio of benzene, ethanol and water in the filtrates was 16:53:31. The J was reduced with the passage of time and the initial Pe of $8.2 \times 10^{-7}$ cm$^2$/sec.cmHg was rapidly reduced to $1 \times 10^{-7}$ cm$^2$/sec.cmHg.

EXAMPLE 11

One of the regenerated cellulose porous membranes prepared in the same manner as in Example 1 and one of the cellulose acetates having an acetyl content of 54.3% prepared in the same manner as in Example 4, Sample 7 of U.S. Pat. No. 3,883,626, polyvinyl chloride porous membranes prepared in the same manner as in Example 4 of Japanese Patent Publication No. 7724/1981 and polypropylene porous membranes prepared in the same manner as in Example 5 were fixed as a hydrophilic polymeric porous membrane 204 and a hydrophobic polymeric porous membrane 205 in the filtering apparatus as shown in FIG. 5. A mixture of benzene and ethanol at a weight ratio of 3:7 was employed as a feed in the state of one phase and water was employed as a liquid(B), and the mixing weight ratio of benzene, ethanol and water was adjusted to be 3:7:7. The $2\bar{r}a$ of the membranes employed was within the range of $(8.2 \sim 10.2) \times 10^{-6}$ cm and nearly equal. Ultrafiltration was carried out at a constant pressure of $\Delta P_1 = \Delta P_2 = 1.1$ cmHg and the results are shown in Table 10.

TABLE 10

Polymeric Substance of Porous Membrane & Composition of Filtrate

| Run No. | Polymeric Porous Membrane 204 | | | Polymeric Porous Membrane 205 | | | Composition of Filtrates [Benzene/Ethanol/Water (weight ratio)] | |
|---|---|---|---|---|---|---|---|---|
| | Polymeric Substance | $2\bar{r}a$ (cm) | Pr (%) | Polymeric Substance | $2\bar{r}a$ (cm) | Pr (%) | Filtrate in Chamber 202 | Filtrate in Chamber 203 |
| 1 | Regenerated Cellulose | $9.2 \times 10^{-6}$ | 71 | Cellulose Acetate | $9.1 \times 10^{-6}$ | 75 | 9/50/41 | 18/50/32 |
| 2 | Regenerated Cellulose | $9.2 \times 10^{-6}$ | 71 | Polyvinyl Chloride | $8.2 \times 10^{-6}$ | 69 | 9/50/41 | Two-Phase Separation 35/48/17 |
| 3 | Regenerated Cellulose | $9.2 \times 10^{-6}$ | 71 | Polypropylene | $1.02 \times 10^{-5}$ | 70 | 8/49/43 | 62/30/8 |
| 4 | Cellulose Acetate | $9.1 \times 10^{-6}$ | 75 | Polyvinyl Chloride | $8.2 \times 10^{-6}$ | 69 | 13/53/34 | Two-Phase Separation |
| 5 | Cellulose Acetate | $9.1 \times 10^{-6}$ | 75 | Polypropylene | $1.02 \times 10^{-5}$ | 70 | 12/52/36 | 40/43/17 |
| 6 | Polyvinyl Chloride | $8.2 \times 10^{-6}$ | 69 | Polypropylene | $1.02 \times 10^{-5}$ | 70 | Two-Phase Separation (32/48/20) | 60/31/9 |

As is clear from Table 10, the filtrate through the polyvinyl chloride porous membrane is in the state of two phases but the composition of the filtrate is different from the feed in the state of two phases. With a combination of the regenerated cellulose porous membrane and the cellulose acetate porous membrane, the permeation rate(J) is reduced with the passage of time and at the same time the composition of the filtrate in the chamber 203 is greatly changed and thus such a combination of polymeric porous membranes is not preferred. Also with a combination of the polyvinyl chloride porous membrane and the polypropylene porous membrane, the J is reduced with the passage of time and at the same time the composition of the filtrate phy. In the ultrafiltration, the J did not change with the passage of time. The results are shown in Table 11.

TABLE 11

| Example 12 Run No. | Composition of Chamber 201 (weight %) | Composition of Chamber 202 (weight %) | Composition of Chamber 203 (weight %) |
| --- | --- | --- | --- |
| 1 | acetic acid/benzene/water 41.7/41.7/16.7 | acetic acid/benzene/water 61.4/6.1/32.5 | acetic acid/benzene/water 16.3/82.9/0.8 |
| 2 | ethanol/water/n-hexane 54.5/36.4/9.0 | ethanol/water/n-hexane 56.9/40.2/2.9 | ethanol/water/n-hexane 1.8/0.5/97.7 |

Operation Temperature: 25° C.
Regenerated Cellulose Porous Membrane: (Membrane 204)
$2\overline{ra}$: $2 \times 10^{-5}$ cm
Pr: 69%
d: about 45 μm
Polypropylene Porous Membrane: (Membrane 205)
$2\overline{ra}$: $2.5 \times 10^{-5}$ cm
Pr: 68%
d: about 45 μm in the chamber 202 is greatly varied. Thus such a combination of polymeric porous substances is not preferred. On the other hand, with a combination of the regenerated cellulose porous membrane and the polypropylene porous membrane or a combination of the cellulose acetate porous membrane and the polypropylene porous membrane, good ultrafiltration was carried out.

EXAMPLE 12 RUN NO. 1

A regenerated cellulose porous membrane as shown below prepared in the same manner as in Example 1 and a polypropylene porous membrane prepared in the same manner as in Example 5 were fixed in the apparatus as shown in FIG. 5 as a hydrophilic polymeric porous membrane 204 and a hydrophobic polymeric porous membrane 205, respectively. A mixture of benzene and acetic acid at a weight ratio of 1:1 was employed as a feed in the state of one phase and charged into a chamber 201 having a volume of 50 ml and water was charged as a liquid (B) into the chamber 201 to render the feed in the state of phase separation at a mixing ratio of the feed to water of 1:0.4. Then the feed in the state of phase separation obtained was stirred with a rotor 209 and a pressure was loaded on the membranes 204 and 205 by a compressor as a pressure source 208. Ultrafiltration was carried out at a constant condition of $\Delta P_1 = \Delta P_2 = 1.3$ cmHg and the filtrate in the chamber 202 having permeated through the membrane 204 and the filtrate in the chamber 203 having permeated through the membrane 205 were collected from outlets 210 and 213, respectively, and their compositions were analyzed by gas chromatography. In the ultrafiltration the permeation rate(J) did not change with the passage of time. The results are shown in Table 11.

EXAMPLE 12 RUN NO. 2

In the same manner as in Example 10 a mixture of ethanol and n-hexane at a weight ratio of 6:1 was employed as a feed in the state of one phase and water was added to the feed at a weight ratio of the feed to the water of 1:4 to render the feed in the state of phase separation and then ultrafiltration was conducted in the same manner as in Example 10 and the compositions of the filtrate obtained were analyzed by gas chromatogra- As is clear from Table 11, benzene is concentrated in the chamber 203 in Example 12 Run No. 1 and n-hexane is concentrated in the chamber 203 in Example 12 Run No. 1.

EXAMPLE 13

In the same manner as inn Example 1 a regenerated cellulosoe membrane having a $2\overline{ra}$ of $1.0 \times 10^{-5}$ cm, a Pr of 67% and a d of $2.5 \times 10^{-3}$ cm was prepared and a polypropylene porous membrane having a $2\overline{ra}$ of $1.1 \times 10^{-4}$ cm, a Pr of 75% and a d of $1.5 \times 10^{-3}$ cm was prepared in the same manner as in Example 5.

Figure 6:
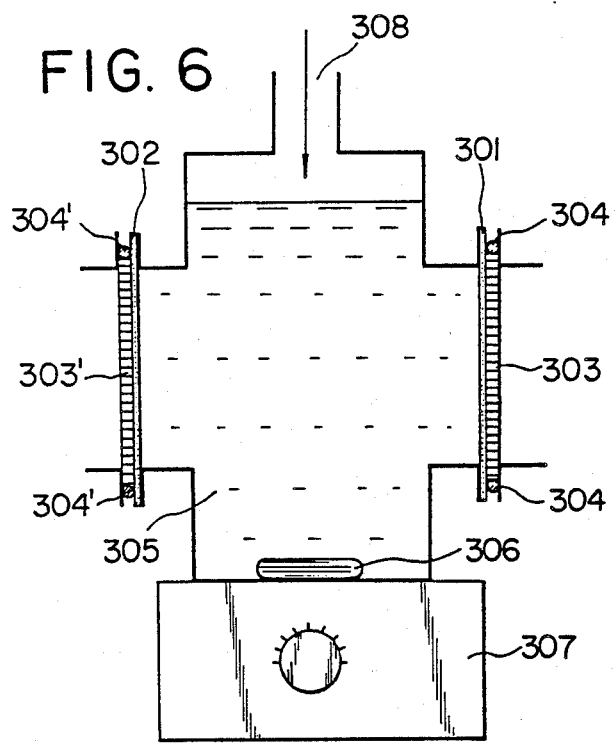
FIG. 6 illustrates still another embodiment of a horizontal-type filtering apparatus employed in the process of this invention in which the numbered elements are as follows: 301, a hydrophilic polymeric porous membrane; 302, a hydrophobic polymeric porous membrane; 303 and 303', mesh supporters for the membranes 301 and 302, respectively; 304 and 304', silicone O-rings; 305, a chamber for a feed; 306, a rotor; 307, a stirrer; and 308, an inlet for the feed.

In the filtering apparatus as shown in FIG. 6, the regenerated cellulose porous membrane as obtained above was fixed as the hydrophilic polymeric porous membrane 301 by a stainless steel mesh supporter 303 and silicone o-rings 304. Also the polypropylene porous membrane as obtained above was fixed as the hydrophobic polymeric porous membrane 302 by a stainless steel mesh supporter 303' and silicone o-rings 304'.

Into the chamber 305 between the membranes 301 and 303 was charged 100.0 g of a 50% by weight aqueous ethanol solution(ethanol: a product of Kishida Chemical Co., Ltd.) and stirred with a rotor 306 rotated by an electromagnetic stirred 307. Then 50 g of one of potassium fluoride(a product of Kishida Chemical Co., Ltd., guaranteed reagent), ammonium fluoride(a product of Kishida Chemical Co., Ltd., guaranteed reagent) and potassium carbonate(anhydrous, a product of Kishida Chemical Co., Ltd.) was added to the aqueous ethanol solution under stirring with a rotor 306 at a rate of 100 r.p.m. to render the aqueous ethanol solution in the state of phase separation. While stirring the aqueous ethanol solution in the state of phase separation formed with the rotor 306 at a rate of 100 r.p.m., a filtrate(I) having permeated through the membrane 301 and a filtrate(II) having permeated through the membrane 302 were collected, respectively. The compositions of the filtrates were analyzed. The water content was measured by the Karl Fischer's method using an apparatus (AQUA COUNTER AQ-1 Type, manufactured Hiranuma Co., I.td.) and the amount of ethanol was measured by a gas chromatograph (GC4M-Type, manufactured by Shimadzu Seisakusho Ltd.) and the amount of the salts was measured by a method of evaporation to dryness. The results are shown in Table 12.

TABLE 12

| Run No. | Salt Added | Filtrate (I) | | | Filtrate (II) | | |
|---|---|---|---|---|---|---|---|
| | | Water (weight %) | Ethanol (weight %) | Salt (weight %) | Water (weight %) | Ethanol (weight %) | Salt (weight %) |
| 1 | KF | 54.3 | 0.6 | 45.1 | 1.3 | 92.3 | 6.4 |
| 2 | NH$_4$F | 58.5 | 9.6 | 31.9 | 13.1 | 84.6 | 2.3 |
| 3 | K$_2$CO$_3$ (anhydrous) | 44.6 | 0.2 | 55.2 | 9.1 | 90.8 | 0.1 |

Note:
Conditions of Membrane Filtration:
Effective Filtration Area(S): about 9.5 cm$^2$; its diameter: 35 m/m
Pressure Difference($\Delta$P): about 8 gram weight/cm$^2$(head difference from the center of the membrane to the liquid surface: about 5 cm)
Temperature: 20° C.
Peameability Coefficient(Pe):
Regenerated Cellulose Porous Membrane: 3.0 × 10$^{-4}$(cm/sec · cmHg)
Polypropylene Porous Membrane: 5.3 × 10$^{-4}$(cm/sec · cmHg)

As is clear from Table 12, the contents of water and the salt in the filtrate(I) are higher than those in the filtrate (II) while the content of ethanol in the filtrate (11) is higher than that in the filtrate(I). According to the present process, the concentration of ethanol of 50% by weight has been markedly condensed to that of 84-92% by weight. In addition, the pressure of operation is only a head difference of the liquid surface and thus the condensation and dehydration of ethanol can be easily conducted using polymeric porous membranes with hardly any pressure added.

The Pe was in the range of 3.0–5.3×10$^{-4}$ (cm$^2$/sec.). cmHg) which was much higher than that in the conventional membrane separation.

Thus according to the present process of this invention concentrated ethanol can be speedily obtained from dilute ethanol with a small amount of operational energy. It is also possible to continuously condense dilute ethanol since an aqueous salt solution hardly containing ethanol can be recovered from the hydrophilic polymeric porous membrane.

EXAMPLE 14

The same filtering apparatus as in Example 13 was employed and the same regenerated cellulose porous membrane and polypropylene porous membrane as in Example 13 were employed as the hydrophilic polymeric porous membrane and the hydrophobic polymeric porous membrane, respectively and fixed in the same manner as in Example 13.

To 100.0 g of a 20.5-55.8% by weight aqueous ethanol solution was added 21.2-64.2 g of one of the salts set forth in Table 13, and the aqueous ethanol solution was rendered in the state of phase separation. Then the aqueous ethanol solution in the state of phase separation was charged 20 in the chamber 305 and under stirring with a rotor 306 the filtrate(II) having permeated through the polypropylene porous membrane was collected.

The composition of the filtrate(II) was analyzed by the same methods as in Example 13. The results are shown in Table 13.

TABLE 13

Composition of Filtrate Having Permeated Through Hydrophobic Polymeric Porous Membrane In Case Of Adding Various Salts To Aqueous Ethanol Solution

| Run No. | Salt Added | Concentration of Ethanol before Addition of Salt (weight %) | Amount of Salt (g) | Filtrate(II) | | |
|---|---|---|---|---|---|---|
| | | | | Water (weight %) | Ethanol (weight %) | Salt (weight %) |
| 1 | KF | 50.0 | 52.7 | 6.4 | 92.3 | 1.3 |
| 2 | NaOH | 33.1 | 32.7 | 36.6 | 45.1 | 18.3 |
| 3 | KOH | 46.6 | 64.2 | 27.1 | 49.0 | 23.9 |
| 4 | Na$_2$SO$_4$(anhydrous) | 20.5 | 25.9 | 66.5 | 27.3 | 6.2 |
| 5 | K$_2$CO$_3$(anhydrous) | 55.8 | 43.7 | 9.1 | 90.8 | 0.1 |
| 6 | Na$_2$CO$_3$(anhydrous) | 29.9 | 32.6 | 33.2 | 66.5 | 0.3 |
| 7 | Na$_2$S$_2$O$_3$ | 40.5 | 42.9 | 42.2 | 56.7 | 1.1 |
| 8 | MnSO$_4$.4H$_2$O~5H$_2$O | 31.7 | 47.1 | 56.7 | 37.9 | 5.4 |
| 9 | MgSO$_4$.7H$_2$O | 50.0 | 38.9 | 47.5 | 52.0 | 0.5 |
| 10 | NH$_4$F | 50.0 | 37.1 | 13.1 | 84.6 | 2.3 |
| 11 | (NH$_4$)$_2$SO$_4$ | 34.7 | 35.3 | 46.2 | 50.0 | 3.8 |
| 12 | Al$_2$(SO$_4$)$_3$(anhydrous) | 35.2 | 21.2 | 37.2 | 60.8 | 2.0 |

Notes:
Conditions of Membrane Filtration:
Effective Filtration Area(S): about 9.5 cm$^2$; its diameter: 35 m/m
Pressure Difference($\Delta$P): about 8 gram weight/cm$^2$(head difference from the center of the membrane to the liquid surface: about 5 cm)
Temperature: 20° C.
Permeability Coefficient(Pe):
Regenerated Cellulose Porous Membrane } about 5.5 × 10$^{-4}$(cm$^2$/sec · cmHg)
Polypropylene Porous Membrane }
The salts of Run Nos. 1-11 and ethanol employed were products of Kishida Chemical Co., Ltd.(guaranteed reagent) and the salt of Run No. 12 was a product of Kanto Chemical Co., Ltd.

The salts set forth in Table 13 are examples of salts capable of rendering an aqueous ethanol solution in the state of phase separation. As is clear from Table 13, when an aqueous ethanol solution rendered in the state of phase separation by the addition of these salts is filtered using a pair of a regenerated cellulose porous membrane and a polypropylene porous membrane, the concentration of ethanol in the filtrate(II) having permeated through the polypropylene porous membrane is increased than that before the addition of any of these salts and the concentration of ethanol can be easily carried out under a very low operational pressure. Especially with potassium fluoride, potassium carbonate and ammonium fluoride, the concentration of ethanol can be increased to about 90% by weight with their extremely reduced amount and thus, the concentration of an aqueous ethanol solution can be carried out at an excellent efficiency.

EXAMPLE 15

The same filtering apparatus as in Example 13 was employed and the same regenerated cellulose porous membrane and polypropylene porous membrane as in Example 13 were employed as the hydrophilic polymeric porous membrane and the hydrophobic polymeric membrane, respectively and fixed in the same manner as in Example 13.

To 100.0 g of a 9.5–73.7% by weight aqueous ethanol solution(ethanol: a product of Kishida Chemical Co., Ltd., guaranteed reagent) was added 9.5–47.1 g of potassium carbonate(anhydrous, Kishida Chemical Co., Ltd., guaranteed reagent) and the aqueous ethanol solution was rendered in the state of phase separation. Then the aqueous ethanol solution in the state of phase separation was charged in the chamber 305 and under stirring with a rotor 306 the filtrate (II) having permeated through the polypropylene porous membrane was collected.

The composition of the filtrate(II) was analyzed by the same methods as in Example 13. The results are shown in Table 14.

TABLE 14

| Run No. | Concentration of Ethanol before Addition of Salt (weight %) | Amount of $K_2CO_3$ (g) | Filtrate (II) Water (weight %) | Ethanol (weight %) | Salt (weight %) |
| --- | --- | --- | --- | --- | --- |
| 1 | 9.5 | 27.2 | 46.8 | 51.3 | 1.9 |
| 2 | 10.6 | 47.1 | 11.0 | 89.0 | 0*1 |
| 3 | 11.2 | 24.6 | 50.9 | 45.1 | 4.0 |
| 4 | 13.7 | 20.6 | 43.3 | 55.0 | 1.7 |
| 5 | 18.3 | 44.8 | 10.9 | 89.1 | 0*1 |
| 6 | 26.5 | 22.6 | 38.6 | 60.0 | 1.4 |
| 7 | 40.8 | 36.5 | 10.4 | 89.6 | 0*1 |
| 8 | 46.2 | 15.7 | 31.8 | 68.0 | 0.2 |
| 9 | 55.9 | 30.4 | 9.2 | 90.8 | 0*1 |
| 10 | 69.3 | 9.5 | 19.1 | 80.9 | 0*1 |
| 11 | 73.7 | 20.6 | 8.3 | 91.7 | 0*1 |

Notes:
*1 A very minute amount of the salt was detected.
Conditions of Membrane Filtration:

Effective Filtration Area(S): about 9.5 $cm^2$; its diameter: 35 m/m
Pressure Difference($\Delta P$): about 8 gram weight/$cm^2$(head difference from the center of the membrane to the liquid surface: about 5 cm)
Temperature: 20° C.
Permeability Coefficient(Pe):
Regenerated Cellulose Porous Membrane ⎫ about 5.5 × $10^{-4}$
Polypropylene Porous Membrane ⎭ : ($cm^2$/sec · cmHg)

As is clear from Table 14, the concentration of an aqueous ethanol solution of even around 10% by weight can be markedly increased to approximately 90% by weight by the addition of potassium carbonate and hardly any potassium carbonate is not dissolved in the concentrated ethanol. In spite of the low operation pressure, the Pe is extremely greater than the conventional Pe due to the great $2\overline{ra}$ and it can be understood that the present process of this invention is an epoch-making membrane separation process for speedily producing concentrated ethanol from dilute ethanol with a small amount of energy.

EXAMPLE 16

The same filtering apparatus as in Example 13 was employed and a regenerated cellulose porous membrane having a $2\overline{ra}$ of $1.2 \times 10^{-5}$ cm, a Pr of 68% and a d of $2.5 \times 10^{-3}$ cm prepared in the same manner as in Example 1 was employed as the hydrophilic polymeric porous membrane, and as the hydrophobic polymeric porous membrane a polyvinylidene fluoride having a $2\overline{ra}$ of $1.1 \times 10^{-4}$ cm, a Pr of 75% and a d of $2.5 \times 10^{-3}$ cm prepared in the same manner as described in Japanese Patent Publication(OPI) No. 99934/1980 and a polypropylene porous membrane having a $2\overline{ra}$ of $1.1 \times 10^{-4}$ cm, a Pr of 75% and a d of $1.5 \times 10^{-3}$ cm prepared in the same manner as in Example 5 and three commercially available polytetrafluoroethylene porous membranes("FALP04700", a product of Millipore Corporation) each having a $2\overline{ra}$ of $1.0 \times 1^{-4}$ cm, a Pr of 63% and a d of $1.0 \times 10^{-3}$ cm; and a $2\overline{ra}$ of $1.0 \times 10^{-3}$ cm, a Pr of 63% and a d of $1.0 \times 10^{-2}$ cm, These membranes were fixed in the same manner as in Example 13.

In 100.0 g of an aqueous ethanol solution containing 25% by weight of ethanol(ethanol: a product of Kishida Chemical Co., Ltd., guaranteed reagent) was added potassium carbonate(anhydrous, a product of Kishida Chemical Cc., Ltd., ( guaranteed reagent) to obtain a composition of potassium carbonate, ethanol, water of 33:13:53 (weight ratio) and the aqueous ethanol solution was rendered in the state of phase separation. Then the aqueous ethanol solution rendered in the state of phase separation was charged in the chamber 305 and under stirring with a rotor 306 the filtrate(II) having permeated through the hydrophobic polymeric porous membrane was collected.

The composition of the filtrate(II) was analyzed by the same methods as in Example 13. The results are shown in Table 15.

TABLE 15

| Run No. | Hydrophobic Polymeric Porous Membrane | Mean Pore Size [$2\overline{ra}$(cm)] | Effective Pressure Difference [$\Delta P$(cmHg)] | Permeability Coefficient [Pe($cm^2$sec · cmHg)] | Filtrate (II) Ethanol (weight %) | Water (weight %) |
| --- | --- | --- | --- | --- | --- | --- |
| 1 | Polypropylene | $1.1 \times 10^{-4}$ | 0.45 | $5.6 \times 10^{-4}$ | 75.6 | 24.3 |
| 2 | Polytetrafluoroethylene | $1.0 \times 10^{-4}$ | 0.45 | $6.5 \times 10^{-4}$ | 75.3 | 24.5 |
| 3 | Polyvinylidene | $1.1 \times 10^{-4}$ | 0.45 | $5.2 \times 10^{-4}$ | 75.7 | 24.2 |

TABLE 15-continued

| Run No. | Hydrophobic Polymeric Porous Membrane | Mean Pore Size $[2\overline{ra}(cm)]$ | Effective Pressure Difference $[\Delta P(cmHg)]$ | Permeability Coefficient $[Pe(cm^2 sec \cdot cmHg)]$ | Filtrate (II) Ethanol (weight %) | Water (weight %) |
|---|---|---|---|---|---|---|
| 4 | Polytetrafluoroethylene fluoride | $1.0 \times 10^{-3}$ | 0.45 | $8.5 \times 10^{-4}$ | poor separation | |
| 5 | Polytetrafluoroethylene | $1.0 \times 10^{-4}$ | 4.5 | $7.3 \times 10^{-3}$ | poor separation | |

Notes:
Effective filtration area(S) of all the membranes employed: about 9.5 cm²; its diameter: 35 m/m
Operation temperature: 20° C.

As is clear from Table 15, when the equations(1) to (3) are satisfied, concentrated ethanol can be satisfactorily obtained using any one of porous membranes of polypropylene, polytetrafluoroethylene and polyvinylidene fluoride. On the other hand, when the equations(1) to (3) are not satisfied, the separation of an aqueous ethanol becomes poor.

EXAMPLE 17

Example 16 was repeated varying the stirring means and using the Teflon porous membrane having a $2\overline{ra}$ of $1.0 \times 10^{-4}$ cm, a Pr of 55% and a d of $1.0 \times 10^{-3}$ cm(a product of Millipore Corporation) at an effective pressure difference($\Delta P$) of 0.45 cmHg. The results are shown in Table 16.

TABLE 16

| Run No. | Stirring Method | Permeability Coefficient $[Pe(cm^2/sec \cdot cmHg)]$ | Separation |
|---|---|---|---|
| 1 | Electromagnetic stirrer*¹ (100 r.p.m.) | $6.5 \times 10^{-4}$ | good |
| 2 | Ultrasonic wave*² | $6.5 \times 10^{-4}$ | good |
| 3 | No-stirring | $2.5 \times 10^{-4}$ | good |

Note:
*¹The same as in Example 13.
*²Ultrasonic Wave Generator(4240 Type manufactured by Kaijo Denki Co., Ltd.)

As is clear from Table 16, the Pe can be remarkably improved by the stirring within the apparatus.

EXAMPLE 18

In the same manner as in Example 1 there was prepared a regenerated cellulose porous membrane having a $2\overline{ra}$ of $1.0 \times 10^{-5}$ cm, a Pr of 67% and a d of $2.5 \times 10^{-3}$ cm. Also in the same manner as in Example 5 there was prepared a polypropylene porous membrane having a $2\overline{ra}$ of $1.1 \times 10^{-5}$ cm, a Pr of 70% and a d of $1.5 \times 10^{-3}$ cm. Then these porous membranes were fixed in the same apparatus as in Example 13 in the same manner as in Example 13.

Into the chamber 305 was charged a mixed solution of ethanol, water and benzene at a weight ratio of 30:55:15 and then the mixed solution was rendered in the state of phase separation. The diameter of the membranes 301 and 333 was 47 mm and the depth of the mixed solution to the upper end of the membranes 301 and 303 was 7 cm. The mixed solution in the state of phase separation was vigorously stirred with the rotor 306 of the electromagnetic stirrer 307 and a filtrate (I) having permeated through the membrane 301 and a filtrate (II) having permeated through the membrane 302 were collected, respectively. All the operations were carried out at room temperature(20° C.) and the pressure on the mixed solution was varied by pressuring by an air pump (not shown) through an inlet 308. The quantitative analysis of ethanol and benzene in the filtrates(I) and (II) collected was conducted by the same methods as in Example 13. The results are shown in Table 17.

TABLE 17

Relationship between Compositions of Filtrates Having Permeated through Hydrophilic Polymeric Porous Membrane and Hydrophobic Polymeric Porous Membrane and Pressure Difference($\Delta P$)

| Filtrate (membrane) | Components | Pressure Difference($\Delta P$)(cmHg) | | |
|---|---|---|---|---|
| | | 0.5 | 1.0 | 5.5 |
| Filtrate(I) (Regenerated Cellulose) | Ethanol | 34.2 | 34.0 | 30.1 |
| | Water | 64.4 | 64.3 | 55.0 |
| | Benzene | 1.4 | 1.6 | 14.9 |
| Filtrate(II) (Polypropylene) | Ethanol | 5.8 | 5.8 | 30.0 |
| | Water | 1.0 | 1.1 | 55.0 |
| | Benzene | 93.2 | 93.1 | 15.0 |

As is clear from Table 17, the compositions of the filtrates permeating through each of the hydrophilic polymeric porous membrane(regenerated cellulose porous membrane) and the hydrophobic polymeric porous membrane (polyproplene porous membrane) do not change by varying pressure up to 1.0 cmHg ad the water content of the filtrate(I) permeating through the hydrophilic polymeric porous membrane is higher than that of the filtrate(II) permeating through the hydrophobic polymeric porous membrane. However, at a pressure difference($\Delta P$) of above 1.0 cmHg the compositions of both filtrates(I) and (II) become equal to the composition of the mixed solution before separation.

EXAMPLE 19

The same regenerated cellulose porous membrane as in Example 1 was employed as the hydrophilic polymeric porous membrane and a polytetrafluoroethylene porous membrane having a $2\overline{ra}$ of $1.0 \times 10^{-5}$ cm, a Pr of 56% and a d of $1.5 \times 10^{-3}$ cm obtained in the same manner as described in Japanese Patent Application (OPI) No. 105866/198. was employed as the hydrophobic polymeric porous membrane.

In a filtering apparatus similar to the filtering apparatus as illustrated in FIG. 6 and having 6 membrane-holding parts which are the same as 2 membrane-holding parts in the filtering apparatus as illustrated in FIG. 6, 5 sheets 20 of the regenerated cellulose porous membrane and 1 sheet of the polytetrafluoroethylene porous membrane were fixed in the same manner as in Example 13 at the same height in the side wall of a cylinder. The diameter of all the porous membranes was 47 m/m and the depth of liquid to the upper end of the porous membranes was about 7 cm.

A mixed solution of ethanol, water and benzene having a weight ratio of 18.5:7.4 and 74.1 forms an azeotrope. This mixed solution was mixed with a 33% by weight aqueous ethanol solution at a weight ratio of 27:100, and the mixed solution thus obtained was charged in the chamber 305 and the membrane separation was conducted under the same conditions as in Example 13. As a result, an aqueous phase of ethanol, water and benzene having a weight ratio of 34.2: 64.4:1.4 was collected through the regenerated cellulose porous membrane and a benzene phase of ethanol, water and benzene having a weight ratio of 5.8:1.0:93.2 was collected through the polytetrafluoroethylene porous membrane.

Figure 7:
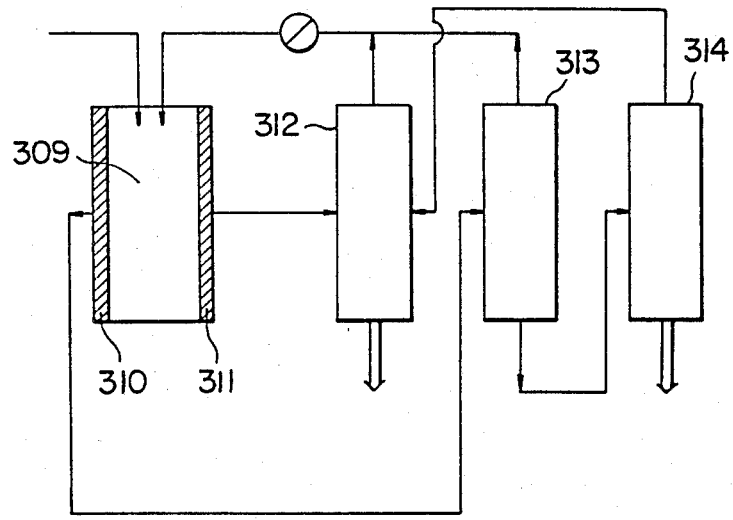
FIG. 7 is a diagram illustrating one embodiment of an apparatus employed in the process for producing anhydrous ethanol according to this invention, in which the numbered elements are as follows: 309, a filtering apparatus; 310, a hydrophilic polymeric porous membrane fixed in the filtering apparatus 309; 311, a hydrophobic polymeric porous membrane fixed in the filtering apparatus 309; 312, a first distillation column; 313, a second distillation column; and 314, a third distillation column.

Furthermore, when the filtrates collected were subjected to distillation as in an apparatus consisting of a filtering apparatus 309 and three distillation colrmns 312, 313 and 314 as shown in FIG. 7, 99.5% by weight of ethanol could be obtained. More specifically, the benzene phase of ethanol, water having a weight ratio of 5.8:1.0:93.2 having permeated through the polytetrafluoroethylene porous membrane 311 as the filtrate was fed to the first distillatior column 312 where the distillation was conducted at 64.9° C. As a result, from the bottom of the first column 312 was obtained 99.5% by weight of ethanol while a mixture of benzere and water from the top of the distillation column 312 was returned to the filtering apparatus 309 together with benzene from the top of the column as a mixture of ethanol, water and benzene having a weight ratio of 18.5:7.4:74.1. The aqueous phase of ethanol, water and benzene at a weight ratio of 34.2:64.4:1.4 having permeated through the regenerated cellulose 20 porous membrane 310 as the filtrate was fed to the distillation column 313 where the distillation was conducted at 64.9° C. As a result, from the bottom of the distillation column 313 was obtained a mixture of ethanol and water at a weight ratio of 34.5:65.5 which was then led to the distillation column 314 where the distillation was conducted at 78.0° C. As a result, from the bottom of the distillation column 314 was removed water while from the top of the distillation column was a mixture of ethanol and water at a weight ratio of 96:4 which was returned to the distillation column 312.

The foregoing examples illustrate, without limitation, the process of the present invention. It is understood that changes and variations can be in the examples without departing from the spirit and scope of the invention as defined in the following claims.

We claim:

1. A process for separating and condensing at least one selected organic liquid from a feed comprising a mixture containing said at least one selected organic liquid in a state of one liquid phase or two liquid phases which comprises providing a Pe of up to $7 \times 10^{-4}$ cm$^2$/sec. cm Hg and an $\alpha$ of up to 255, by, conducting ultrafilitration by using a polymeric porous membrane having a mean pore size ($\overline{2ra}$) of
   (1) $10^{-6}$ cm to $2 \times 10^{-3}$ cm and more than 28 fold the diameters of the molecules to be separated in the case of one liquid phase, or
   (2) $10^{-6}$ cm to $2 \times 10^{-3}$ cm and less than 10 fold the diameters of dispersion particles presented in the feed in the case of two liquid phases, and having a porosity (pr) of at least 50% under the conditions that the effective pressure difference ($\Delta P$) is less than 2 cmHg and that the effective pressure gradient ($\Delta P/d$) loaded on the polymeric porous membrane satisfies the following equations:

$$\Delta P/d < 1000 \text{ (cmHg/cm)} \quad (1)$$

and $$\Delta P/d \leq 1 \times 10^{-1} \, d\eta/[(ra)^2 Pr] \text{(cmHg/cm)} \quad (2)$$

wherein
   $\Delta P$(cmHg) is the effective pressure difference between the surfaces of the membrane,
   $d$(cm) is the thickness of the membrane,
   $ra$(cm) is the mean pore radius of the membrane,
   $Pr$(%) is the porosity of the membrane and
   $\eta$ (centipoise) is the viscosity of at least one selected organic liquid.

2. Process of claim 1 wherein the feed is in the state of one phase.

3. Process of claim 2 wherein the polymeric substance constituting the polymeric porous membrane has a solubility parameter ($\delta p$ (cal/cm$^3$)$^{\frac{1}{2}}$) and the at least one selected organic liquid has a solubility parameter ($\delta s$ (cal/cm$^3$)$^{\frac{1}{2}}$) and the difference between ($\delta P$) and ($\delta s$) is at most 15(cal/cm$^3$)$^{\frac{1}{2}}$.

4. The process of claim 3, wherein $\delta p$ is either, at most about 8.5 (cal/cm$^3$)$^{\frac{1}{2}}$, or at least about 10 (cal/cm$^3$)$^{\frac{1}{2}}$.

5. Process of claim 3 which comprises swelling the polymeric porous membrane with a liquid having a solubility parameter of from $\delta p - 3$(cal/cm$^3$)$^{\frac{1}{2}}$ to $\delta p + 3$(cal/cm$^3$)$^{\frac{1}{2}}$ and simultaneously smaller than $\delta_s - 3$(cal/cm$^3$)$^{\frac{1}{2}}$ or greater than $\delta_s + 3$(cal/cm$^3$)$^{\frac{1}{2}}$ before conducting the ultrafiltration.

6. Process of claim 5, wherein the polymeric substance constituting the polymeric porous membrane is regenerated cellulose and the liquid for swelling the polymeric porous membrane is water.

7. Process of claim 3, wherein the difference between the solubility parameters of at least two liquid to be separated in the feed is at least 2(cal/cm$^3$)$^{\frac{1}{2}}$.

8. Process of claim 3 which comprises conducting ultrafiltration by contacting, through a polymeric porous membrane having a $\overline{2ra}$ of at least $10^{-6}$ cm and a Pr of at least 50%, the feed with one surface of the polymeric porous membrane and a liquid which is a non-solvent for the polymeric porous membrane but is a good solvent for at least one liquid in the feed and is simultaneously a poor solvent or a non-solvent for at least one liquid in the feed with the other surface of the polymeric porous membrane under the condition that the effective pressure gradient ($\Delta P/d$) loaded on the membrane satisifies the equations (1) and (2) as described above and the pressure difference between the two surfaces of the polymeric porous membrane ($\Delta P$) satisfies the following equation:

$$\Delta P < 2 \times 10^{-5}/ra \text{ cmHg} \quad (3)$$

wherein $\Delta P$ and $\overline{ra}$ are the same as defined above.

9. The process of claim 8, wherein $\delta p$ is either, at most about 10 (cal/cm$^3$)$^{\frac{1}{2}}$, or at least about 12.5 (cal/cm$^3$)$^{\frac{1}{2}}$.

10. Process of claim 8, wherein at least one liquid surface contacting the polymeric porous membrane is vibrated by ultrasonic waves.

11. Process of claim 8, wherein the $\delta p$ is at least 15 (cal/cm$^3$)$^{\frac{1}{2}}$ and at the same time the liquid which is a non-solvent for the polymeric porous membrane is a hydrophobic liquid having a solubility parameter of at most 9 (cal/cm$^3$)$^{\frac{1}{2}}$.

12. Process of claim 2 which comprises conducting ultrafiltration under the conditions that the feed contacts with one surface of the polymeric porous membrane (X) having a $2\overline{ra}$ of at least $10^{-6}$ cm and a Pr of at least 50% and that liquid, which is a non-solvent for both the polymeric porous membrane (X) and another polymeric porous membrane (Y) separately provided having a $2\overline{ra}$ of at least $10^{-6}$ cm and a Pr of at least 50% and which is a good solvent for at least one of the at least one selected organic liquid in the feed but a non-solvent for at least one other organic liquid in the feed and which is simultaneously capable of causing phase separation in the feed, contacts with one surface of the polymeric porous membrane (Y) under the conditions that the effective pressue differences ($\Delta P$) loaded on the membranes (X) and (Y) satisfy the equatione (1) to (2) as described above, and wherein $\Delta P \leq 2 \times 10^{-5}/\overline{ra}$.

13. Process of claim 12, wherein both the polymeric substances constituting the polymeric porous membranes(X) and (Y) have a solubility parameter of at most 10 $(cal/cm^3)^{\frac{1}{2}}$ or at least 12.5 $(cal/cm^3)^{\frac{1}{2}}$.

14. Process of claim 12, wherein at least one liquid surface contacting the polymeric porous membranes(X) and (Y) is vibrated by ultrasonic waves.

15. Process of claim 12, wherein the polymeric substances constituting the polymeric porous membranes(X) and (Y) are hydrophilic polymeric substances having a solubility parameter of at least 15 $(cal/cm^3)^{\frac{1}{2}}$ and the liquid which is a non-solvent for both said polymeric porous membranes is a hydrophobic liquid having a solubility parameter of at most 9 $(cal/cm^3)^{\frac{1}{2}}$.

16. Process of claim 1, wherein the feed is an aqueous ethanol solution.

17. Process of claim 16 which comprises rendering the aqueous ethanol solution in the state of phase separation by addition of at least one substance selected from the group consisting of (a) fluorides, hydroxides, sulfates, carbonates or thiosulfates of an alkali metal, (b) sulfates of a metal cation having an ionic radius of at least 1.30Å except an alkali earth metal and having a solubility in water at 25° C. of at least 10 g/100 ml and (c) ammonium salts to the aqueous ethanol solution and conducting the ultrafiltration of the aqueous ethanol solution in the state of phase separation by using a hydrophilic polymeric porous membrane having a solubility parameter ($\delta p$) $(cm/cm^3)^{\frac{1}{2}}$ and a hydrophobic polymeric porous membrane having a solubility parameter ($\delta s$) $(cm/cm^3)^{\frac{1}{2}}$ both having a $2\overline{ra}$ of at least $10^{-6}$ cm and a Pr of at least 50%, the difference between ($\delta p$) and ($\delta s$) being at most 15 $cal/cm^3)^{\frac{1}{2}}$ thereby separating and condensing ethanol.

18. Process of claim 17, wherein the solubility parameter of the polymeric substance constituting the hydrophilic polymeric porous membrane is at least 15 $(cal/cm^3)^{\frac{1}{2}}$ and at the same time that constituting the hydrophobic polymeric porous membrane is at most 9 $(cal/cm^3)^{\frac{1}{2}}$.

19. Process of claim 1, wherein the hydrophilic polymeric porous membrane is a regenerated cellulose porous membrane having a $2\overline{ra}$ of from about $5 \times 10^{-6}$ cm to about $1 \times^{-3}$ cm.

20. Process of claim 17, wherein the pressure difference ($\Delta P$) loaded on the hydrophilic and hydrophobic polymeric porous membranes in the ultrafiltration satisfy the following equation:

$$\Delta P \leq 4 \times 10^{-5}/\overline{ra} \qquad (cmHg)$$

21. Process of claim 20, wherein the pressure differences ($\Delta P$) loaded on the hydrophilic and hydrophobic polymeric porous membranes satisfy the equation $\Delta P \leq 2 \times 10^{-5}/\overline{ra}$.

22. Process of claim 20, wherein the ultrafiltration of the aqueous ethanol solution in the state of phase separation is conducted with stirring.

23. Process of claim 17, wherein the ultrafiltration of the aqueous ethanol solution is conducted with stirring.

24. Process of claim 16, which comprises rendering the aqueous ethanol solution in the state of phase separation by mixing an entrainer with the aqueous ethanol solution and conducting the ultrafiltration of the aqueous ethanol solution in the state of phase separation by using at leat one pair of a hydrophilic polymeric porous membrane and a hydrophobic polymeric porous membrane both having a $2\overline{ra}$ of at least $10^{-6}$ cm and a Pr of at least 50%, thereby separating the aqueous ethanol solution into two homogeneous solutions of a solution having a higher water content and a solution having a lower water content.

25. Process of claim 24, wherein the aqueous ethanol solution is rendered in the state of phase separation by addition of at least two azeotropic mixtures selected from the group consisting of an ethanol/water azeotrope, an ethanol/entrainer azeotrope and an ethanol/water/entrainer azeotrope to the aqueous ethanol solution.

26. Process of claim 25, wherein the ultrafiltration of the aqueous ethanol solsution in the state of phase separation is conducted while adding thereto at least one azeotropic mixture selected from the group consisting of an ethanol/water azeotrope, an ethanol/entrainer azeotrope and an ethanol/water/entrainer azeotrope.

27. Process of claim 24, wherein the polymeric substance constituting the hydrophilic polymeric porous membrane has a solubility parameter of at least 15 $(cal/cm^3)^{\frac{1}{2}}$ and at the same time that constituting the hydrophobic polymeric porous membrane has a solublity parameter of 9 $(cal/cm^3)^{\frac{1}{2}}$.

28. Process of claim 24, wherein the hydrophilic polymeric porous membrane is a regenerated cellulose porous membrane having a $2\overline{ra}$ of from $5 \times 10^{-6}$ cm to $5 \times 10^{-4}$ cm.

29. Process of claim 1 which comprises rendering the feed in the state of phase separation and conducting the ultrafiltration of the feed in the state of phase separation simultaneously or successively by using a hydrophilic porous membrane and a hydrophobic porous membrane both having a $2\overline{ra}$ of at least $10^{-6}$ cm and a Pr of at least 50% under the conditions that the pressure differences ($\Delta P$ and $\Delta P_2$) loaded on the hydrophilic and hydrophobic porous membranes satisfy the following equations:

$$\Delta P_1/d < 1000 \text{ (cmHg/cm)} \qquad (1)'$$

$$\Delta P_2/d < 1000 \text{ (cmHg/cm)} \qquad (1)''$$

and $$\Delta P_1/d_2 \leq 1 \times 10^{-1} \, d\eta/((\overline{ra}_1)^2 \cdot Pr) \qquad (2)'$$

$$\Delta P_2/d \leq 1 \times 10^{-1} \, d\eta/((\overline{ra}_2)^2 \cdot Pr) \qquad (2)''$$

and at the same time under the following conditions of pressure:

$$\Delta P_1 \leq 4 \times 10^{-5}/\overline{ra}_1 \text{ (cmHg)} \qquad (4)$$

$$\Delta P_2 = 4 \times 10^{-5}/\overline{ra}_2 \text{ (cmHg)} \qquad (5)$$

wherein $\Delta P_1$ and $\Delta P_2$ (cmHg) are hydrostatic pressure difference between one and the other surfaces of the hydrophilic porous membrane and the hydrophobic porous membrane, respectively, and $\overline{ra}_1$ and $\overline{ra}_2$ (cm) are mean pore radii of the hydrophilic porous membrane and the hydrophobic porous membrane, respectively.

30. Process of claim 29, wherein the $\Delta P_1$ and $\Delta P_2$ satisfy the following equations, respectively, $$P_1 \leqq 2 \times 10^{-5}/\overline{ra}_1 \quad \text{(cmHg)} \quad (6)$$

$$\Delta P_2 \leqq 2 \times 10^{-5}/\overline{ra}_2 \quad \text{(cmHg)} \quad (7)$$

wherein $\Delta P_1/\Delta P_2$ are the same as defined above.

31. Process of claim 24, wherein the solubility parameter of the polymeric substance constituting the hydrophilic porous membrane is at least 12.5 $(cal/cm^3)^{\frac{1}{2}}$ and at the same time that of the polymeric substance constituting the hydrophobic porous membrane is at most 10 $(cal/cm^3)^{\frac{1}{2}}$.

32. Process of claim 29, wherein the hydrophilic porous membrane is a regenerated cellulose porous membrane having a $2\overline{ra}$ of from $5 \times 10^{-6}$ cm to $5 \times 10^{-4}$ cm.

33. Process of claim 29, wherein the ultrafiltration is conducted under stirring by immersing the hydrophilic porous membrane and the hydrophobic porous membrane in the feed in the state of phase separation.

* * * * *

UNITED STATES PATENT AND TRADEMARK OFFICE
CERTIFICATE OF CORRECTION

PATENT NO. : 4,770,786
DATED : Sep. 13, 1988
INVENTOR(S) : Manabe et al.

It is certified that error appears in the above-identified patent and that said Letters Patent is hereby corrected as shown below:

| | |
|---|---|
| Col. 1, line 45 | Correct spelling of --very-- |
| Col. 3, line 27 | Correct spelling of --comprising-- |
| Col. 3, line 31 | Delete "about" |
| Col. 3, line 62 | Correct spelling of --least-- |
| Col. 4, line 35 | Delete "/cm" |
| Col. 4, line 38 | Delete "/cm" |
| Col. 4, line 64 | Delete "about" |
| Col. 6, line 2 | Insert --/-- after "cal" |
| Col. 6, line 5 | Delete "about" |
| Col. 6, line 6 | Delete "us" and substitute --is-- |
| Col. 6, line 18 | Insert --/-- after "cal" |
| Col. 6, line 19 | Insert --/-- after "cal" |
| Col. 6, line 24 | Insert --/-- after "cal" |
| Col. 7, line 14 | Delete "about" and "60" |
| Col. 7, line 46 | Delete "cr" and substitute --or-- |
| Col. 7, line 53 | Correct spelling of --agent-- |
| Col. 7, line 57 | Delete "20" |
| Col. 8, line 20 | Correct spelling of --membrane-- |
| Col. 8, line 22 | Delete "20" |
| Col. 10, line 24 | Delete "20" |
| Col. 12, line 55 | Delete "/cm" |
| Col. 13, line 21 | Correct spelling of --preferred-- |
| Col. 13, line 25 | Delete "23" and substitute -- $\leq$ --. |
| Col. 14, line 34 | Delete "the" in second instance and substitute --be-- |
| Col. 14, line 43 | Correct spelling of --the-- |
| Col. 14, line 64 | Delete "The respective solubility parameter is defined by "ENCYCLOPEDIA OF POLYMER SCIENCE AND TECHNOLOTY VOL. 3 |

UNITED STATES PATENT AND TRADEMARK OFFICE
CERTIFICATE OF CORRECTION

PATENT NO. : 4,770,786

DATED : Sep. 13, 1988

INVENTOR(S) : Manabe et al.

It is certified that error appears in the above-identified patent and that said Letters Patent is hereby corrected as shown below:

|  |  |
|---|---|
|  | P. 834 (Ed. by H. MARK, N.G. GAYLORD and N.M. BILKALES, John Wiley & Sons, Inc. New York)"" |
| Col. 19, line 19 | Delete "about" |
| Col. 22, line 12 | Delete "100%" and substitute --100(%)-- |
| Col. 23, line 49 | Correct spelling of --permeated-- |
| Col. 24, line 52 | Insert --3-- after "membrane" |
| Col. 27, line 53 | Insert --about-- before "10%" |
| Col. 27, line 53 | Insert --about-- before "20%" |
| Col. 29, line 33 | Delete "3'10" and substitute --3X10-- |
| Col. 32, line 29 | Delete "inn" and substitute --in-- |
| Col. 34, line 31 | Delete "20" |
| Col. 36, line 42 | Insert --respectively were employed.-- after "cm," |
| Col. 36, line 48 | Correct spelling of --Co.-- |
| Col. 37, line 13 | Correct spelling of --equations-- |
| Col. 38, line 36 | Delete "ad" and substitute --and-- |
| Col. 38, line 52 | Delete "198." and substitute --1980-- |
| Col. 38, line 58 | Delete "20" |
| Col. 39, line 13 | Correct spelling of --columns-- |
| Col. 39, line 22 | Correct spelling of --benzene-- |
| Col. 39, line 29 | Delete "20" |
| Col. 41, line 14 | Correct spelling of --equations-- |
| Col. 41, line 56 | Delete "1" and substitute --17-- |
| Col. 41, line 65 | Delete all after "ra" and substitute --(cmHg)-- |
| Col. 42, line 13 | Correct spelling of --least-- |

UNITED STATES PATENT AND TRADEMARK OFFICE
CERTIFICATE OF CORRECTION

PATENT NO. : 4,770,786

DATED : Sep. 13, 1988

INVENTOR(S) : Manabe et al.

It is certified that error appears in the above-identified patent and that said Letters Patent is hereby corrected as shown below:

Col. 42, line 29     Correct spelling of --solution--

Col. 42, line 51     Insert --1-- after "P" in first instance

Signed and Sealed this

Twenty-fifth Day of July, 1989

Attest:

DONALD J. QUIGG

Attesting Officer     Commissioner of Patents and Trademarks